(12) United States Patent
Chaulk et al.

(10) Patent No.: US 8,972,405 B1
(45) Date of Patent: Mar. 3, 2015

(54) STORAGE RESOURCE MANAGEMENT INFORMATION MODELING IN A CLOUD PROCESSING ENVIRONMENT

(75) Inventors: Christopher A. Chaulk, Franklin, MA (US); Anthony Patterson, Grenagh (IE); Conor Fox, Donoughmore (IE); Robert A. Lincourt, Jr., Pawtucket, RI (US)

(73) Assignee: EMC Corporation, Hopkinton, MA (US)

( * ) Notice: Subject to any disclaimer, the term of this patent is extended or adjusted under 35 U.S.C. 154(b) by 207 days.

(21) Appl. No.: 13/558,889

(22) Filed: Jul. 26, 2012

(51) Int. Cl.
*G06F 17/30* (2006.01)

(52) U.S. Cl.
USPC ............ 707/737; 707/778; 707/794; 707/808

(58) Field of Classification Search
USPC .......... 707/610, 636, 641, 737, 756, 999.101, 707/755, 770, 776, 778, 794, 795, 797, 707/808; 709/214, 226
See application file for complete search history.

(56) References Cited

U.S. PATENT DOCUMENTS

| | | | |
|---|---|---|---|
| 5,742,792 A | 4/1998 | Yanai et al. |
| 6,434,637 B1 | 8/2002 | D'Errico |
| 6,622,221 B1 | 9/2003 | Zahavi |
| 7,266,706 B2 | 9/2007 | Brown et al. |
| 7,292,969 B1 | 11/2007 | Aharoni et al. |
| 7,392,360 B1 | 6/2008 | Aharoni et al. |
| 7,441,023 B2 | 10/2008 | Benjamin et al. |
| 7,475,207 B2 | 1/2009 | Bromling et al. |
| 7,577,722 B1 | 8/2009 | Khandekar et al. |
| 7,688,753 B1 | 3/2010 | Zimran et al. |
| 7,720,003 B2 | 5/2010 | Benjamin et al. |
| 7,779,291 B2 | 8/2010 | Yoder et al. |
| 7,783,778 B2 | 8/2010 | Benjamin |
| 7,822,939 B1 | 10/2010 | Veprinsky et al. |
| 7,836,018 B2 | 11/2010 | Oliveira et al. |
| 8,028,062 B1 | 9/2011 | Wigmore et al. |
| 2006/0031450 A1 | 2/2006 | Unrau et al. |
| 2006/0069887 A1 | 3/2006 | LeCrone et al. |
| 2009/0070541 A1 | 3/2009 | Yochai |
| 2009/0112789 A1 | 4/2009 | Oliveira et al. |
| 2009/0112811 A1 | 4/2009 | Oliveira et al. |
| 2009/0112880 A1 | 4/2009 | Oliveira et al. |
| 2009/0112921 A1 | 4/2009 | Oliveira et al. |
| 2009/0138415 A1* | 5/2009 | Lancaster ...................... 706/11 |
| 2010/0332454 A1* | 12/2010 | Prahlad et al. ................ 707/741 |
| 2011/0153636 A1* | 6/2011 | Coldicott et al. ............. 707/769 |

OTHER PUBLICATIONS

U.S. Appl. No. 13/335,316, filed Dec. 22, 2011, Lim et al.
U.S. Appl. No. 13/136,359, filed Jul. 29, 2011, Van Der Goot.
U.S. Appl. No. 13/065,806, filed Mar. 30, 2011, Smirnov et al.
U.S. Appl. No. 12/932,080, filed Feb. 17, 2011, Meiri et al.
U.S. Appl. No. 12/930,249, filed Dec. 31, 2010, Monden et al.

(Continued)

*Primary Examiner* — Marc Filipczyk
(74) *Attorney, Agent, or Firm* — Muirhead and Saturnelli, LLC

(57) ABSTRACT

A system is provided for managing data sets in a cloud processing and/or federated environment. In an embodiment, the system described herein may be used in connection with cloud processing of big data sets. The term "big data," as used herein, may be generally defined to describe data sets so large and complex that they become difficult to work with using on-hand database management tools. The system described herein enables the persistent storage of semantic technology statements for big data sets for processing in a cloud processing and/or federated environment.

20 Claims, 16 Drawing Sheets

(56) References Cited

OTHER PUBLICATIONS

EMC Corporation, "ProSphere Discovery and Monitoring for the Modern Data Center," White Paper H8890, Aug. 2011, 17 pp.

EMC Corporation, "ProSphere: Next Generation Storage Resource Management," White Paper H8886, Aug. 2011, 13 pp.

Jennifer Zaino, "Dydra Envisions RDF as a Cloud Service," semanticweb.com, May 9, 2011, 3 pp.

Peter Haase et al., "The eCloudManager Intelligence Edition: Semantic Technologies for Enterprise Cloud Management," 9th International Semantic Web Conference (ISWC2010), 2010, 4 pp.

B. Thompson et al., "Using a Generic Object Model to Build an RDFS Store," World Congress in Computer Science, Computer Engineering, and Applied Computing, 2006, 7 pp.

* cited by examiner

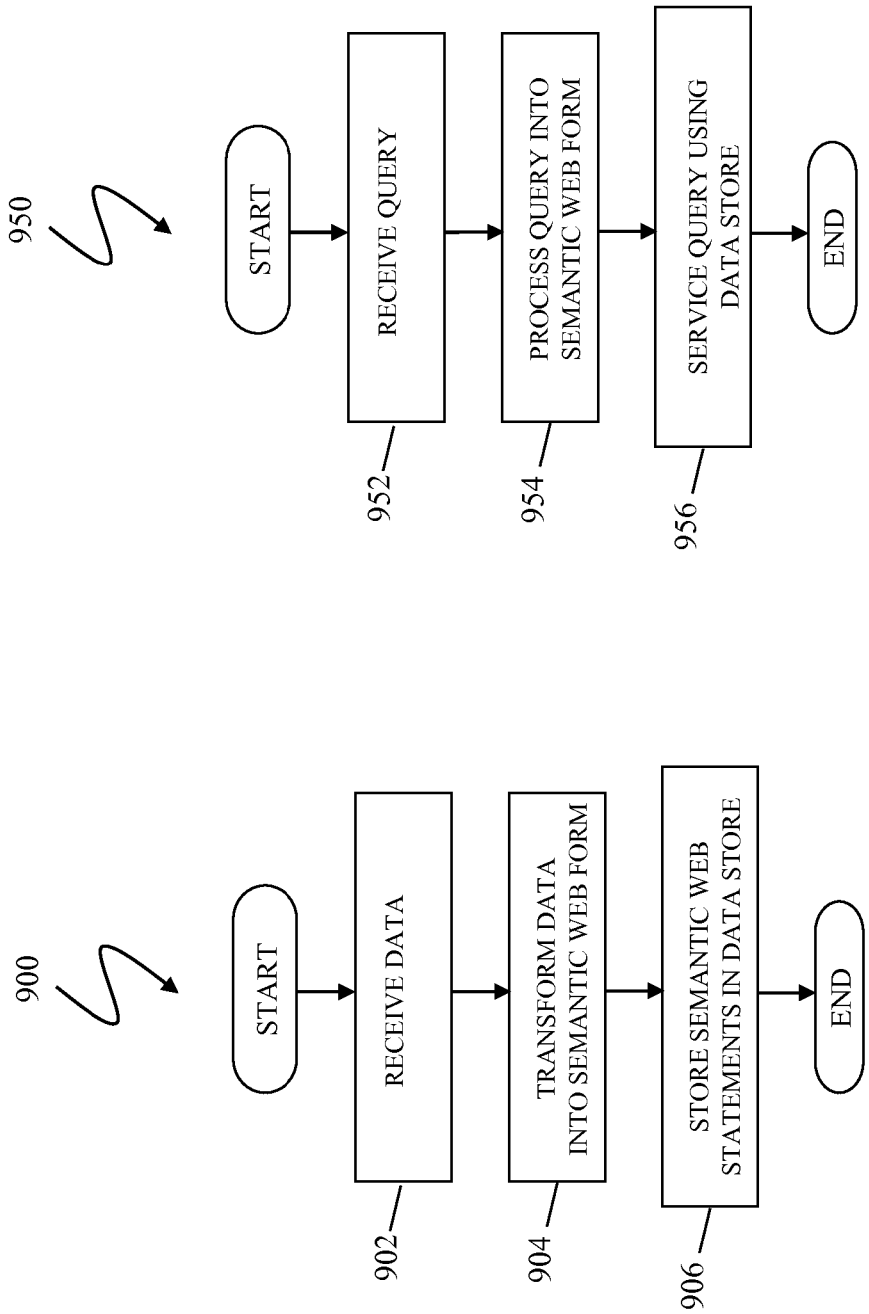

STORAGE RESOURCE MANAGEMENT INFORMATION MODELING IN A CLOUD PROCESSING ENVIRONMENT

TECHNICAL FIELD

This application relates to management of a distributed system and, more particularly, to the managing of data across multiple sites.

BACKGROUND OF THE INVENTION

Host processor systems may store and retrieve data using storage devices (also referred to as storage arrays) containing a plurality of host interface units (host adapters), disk drives, and disk interface units (disk adapters). Such storage devices are provided, for example, by EMC Corporation of Hopkinton, Mass. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives. The hosts, storage devices and/or other elements, such as switches and/or array components, may be provided as part of a storage area network (SAN).

In storage networks, and particularly storage networks including geographically remote access nodes and storage resources, preserving or reducing bandwidth between resources and access nodes is highly desirable as well as providing optimized data availability and access. Data access may be localized, in part to improve access speed to pages requested by host devices. Caching data at access nodes provides localization, however, it is desirable that the cached data be kept coherent with respect to modifications at other access nodes that may be caching the same data. An example of a system for providing distributed cache coherence is described in U.S. Patent App. Pub. No. 2006/0031450 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Cloud computing technologies may provide for the use of online compute, network and storage services to execute applications in a virtual environment and in which resources may be efficiently allocated to provide on-demand compute and storage capacity over a network infrastructure. For discussions of systems and techniques for online services to provide on-demand data storage functions, see, for example, U.S. Pat. No. 7,836,018, entitled "Simultaneously accessing file objects through web services and file services;" US Patent App. Pub. No. 2009-0112811, entitled "Exposing Storage Resources with Differing Capabilities;" US Patent App. Pub. No. 2009-0112921, entitled "Managing Files Using Layout Storage Objects;" US Patent App. Pub. No. 2009-0112880, entitled "Managing File Objects in a Data Storage System;" and US Patent App. Pub. No. 2009-0112789, entitled "Policy Based File Management," all to Oliveira, et al. and which are all hereby incorporated by reference.

It is noted that various issues may occur in connection with the management of resources using technologies like that discussed above. In particular, for example, processing and access of stored data, in particular large amounts of storage, may cause issues involving, for example, access times, processing costs and load balancing requirements among multiple data centers that are geographically dispersed and subject to varying levels of access demands depending on particular locations and/or particular times.

Accordingly, it would be desirable to provide an system that efficiently and effectively manages distributed storage to address issues like that noted above, particularly for a system in which resources are geographically dispersed.

SUMMARY OF THE INVENTION

According to the system described herein, a method for providing storage resource management information modeling in a cloud processing environment includes receiving data from a data source. The data is modeled according to a semantic model to generate modeled data. The modeled data is stored in a data store of the cloud processing environment. The data store is distributed across a plurality of sites of the cloud processing environment. In response to a query, the modeled data is accessed in the data store to service the query. The plurality of sites may include a plurality of data centers of the cloud processing environment. An amount of the data may exceed a threshold, and the threshold may be a processing threshold that is exceeded were the data processed at a local site. The semantic model may include a semantic web model, such as a Resource Descriptor Framework (RDF) model and/or a Web Ontology Language (OWL) model. Modeling the data according to the semantic model may be performed by at least one semantic engine of the cloud processing environment and may include generating a semantic model statement describing the data. The semantic model statement may be a first semantic model statement, and in which modeling the data further includes generating a second semantic model statement, and in which the first semantic model statement and the second semantic model statement are merged in the data store.

According further to the system described herein, a non-transitory computer readable medium stores software for providing storage resource management information modeling in a cloud processing environment. The software includes executable code that receives data from a data source. Executable code is provided that models the data according to a semantic model to generate modeled data. Executable code is provided that stores the modeled data in a data store of the cloud processing environment, in which the data store is distributed across a plurality of sites of the cloud processing environment. Executable code is provided that, in response to a query, accesses the modeled data in the data store to service the query. The plurality of sites may include a plurality of data centers of the cloud processing environment. An amount of the data may exceed a threshold, and the threshold may be a processing threshold that is exceeded were the data processed at a local site. The semantic model may include a semantic web model, such as a Resource Descriptor Framework (RDF) model and/or a Web Ontology Language (OWL) model. The executable code that models the data according to the semantic model may be include executable code of least one semantic engine of the cloud processing environment and may include executable code that generates a semantic model statement describing the data. The semantic model statement may be a first semantic model statement, and in which modeling the data further includes generating a second semantic model statement, and in which the first semantic model statement and the second semantic model statement are merged in the data store.

According further to the system described herein, a storage resource management includes a data store that is distributed across a plurality of sites of a cloud processing environment and a semantic engine. A non-transitory computer readable medium stores software for providing storage resource management information modeling in the cloud processing environment. The software includes executable code that receives data from a data source. Executable code is provided that models the data according to a semantic model of the semantic engine to generate modeled data. Executable code is provided that stores the modeled data in the data store of the cloud processing environment. Executable code is provided that, in response to a query, accesses the modeled data in the data store to service the query. The plurality of sites may include a plurality of data centers of the cloud processing environment. An amount of the data may exceed a threshold, and the threshold may be a processing threshold that is exceeded were the data processed at a local site. The semantic model may include a semantic web model, such as a Resource Descriptor Framework (RDF) model and/or a Web Ontology Language (OWL) model. The executable code that models the data may include executable code that generates a semantic model statement describing the data. The semantic model statement may be a first semantic model statement, and wherein the executable code that models the data further includes executable code that generates a second semantic model statement and merges the first semantic model statement and the second semantic model statement in the data store.

BRIEF DESCRIPTION OF THE DRAWINGS

Embodiments of the system are described with reference to the several figures of the drawings, which are briefly described as follows.

FIG. 14 is a flow diagram showing processing steps of an SRM system to store data in a semantic technology statement form according to an embodiment of the system described herein.

FIG. 15 is a flow diagram showing processing steps of an SRM system for processing a query for data stored according to an embodiment the system described herein.

DETAILED DESCRIPTION OF VARIOUS EMBODIMENTS

Figure 1:
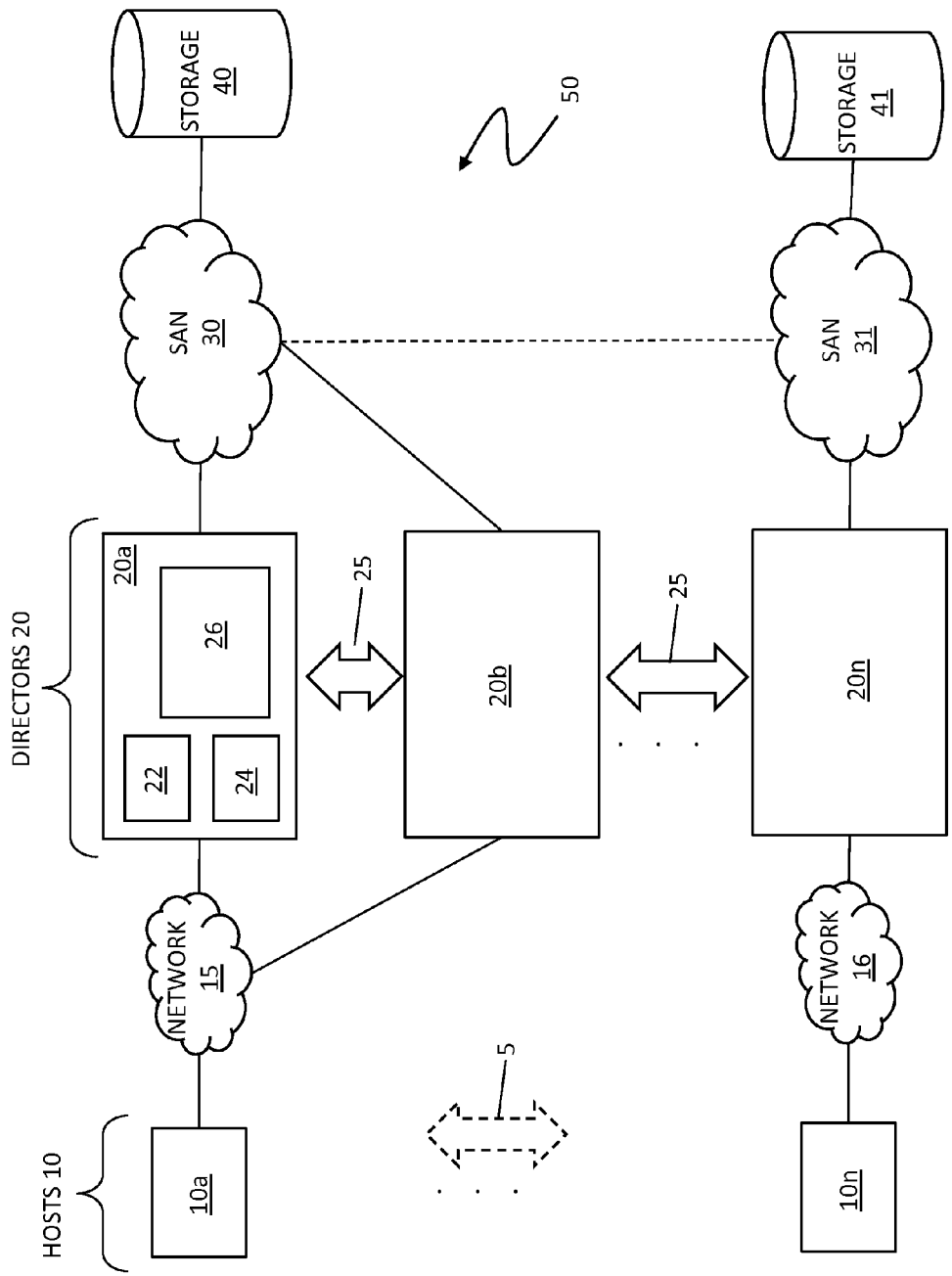
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 (10a to 10n) are communicably coupled with a plurality of directors (or access nodes) 20 (20a, 20b to 20n). Each of the directors 20 may include a processor (CPU) component 22, such as a microprocessor or other intelligence module, a cache component 24 (e.g., RAM cache), an instance of a distributed cache manager 26 and/or other local storage and communication ports. (In general, "n" is used herein to indicate an indefinite plurality, so that the number "n" when referred to one component does not necessarily equal the number "n" of a different component. For example, the number of hosts 10 may or may not equal the number of directors 20 in FIG. 1.) Cache memory may be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc.

The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16, and it is noted that the networks 15, 16 may be combined with, and/or incorporated with, one or more of the SANs 30, 31. Generally, a SAN may be used to couple one or directors and/or host devices with one or more storage devices in a manner that allows reconfiguring connections without having to physically disconnect and reconnect cables from and to ports of the devices. A SAN may be implemented using one or more switches to which the storage devices, directors and/or host devices are coupled. The switches may be programmed to allow connections between specific ports of devices coupled to the switches. A port that can initiate a data-path connection may be called an "initiator" port while the other port may be deemed a "target" port.

Several of the directors 20 may be clustered together at one or more sites and in which the sites are geographically distant from one another. The system described herein may be used in connection with a vSphere product produced by VMware Inc. of Palo Alto, Calif. and/or a VPLEX product produced EMC Corporation of Hopkinton, Mass. The system described herein may also be used in connection with a storage array product produced by EMC Corporation, such as a Symmetrix product, and/or with a Vblock platform product produced by VCE Company, LLC. Although generally discussed and illustrated in connection with embodiment for a distributed storage system, the system described herein may generally be used in connection with any appropriate distributed processing or cloud computing system, as further discussed elsewhere herein.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks.

However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image is the state of the virtual machine as it resides in the host's memory. The VM image may be obtained for an operating VM and transferred to another location where the VM continues execution from the state defined by the virtual machine image. In this way, the VM image may be a snapshot of an execution state of a program by a VM that may be moved between different locations and processing thereafter continued without interruption.

As discussed in detail elsewhere herein, in a virtualized environment, a virtual center, an example of which may be a vCenter product produced by VMware, Inc. of Palo Alto, Calif., may provide a central point of control for managing, monitoring, provisioning and migrating virtual machines. Data storage and management may be provided in connection with one or more data centers coupled by a network. Virtual centers may operate to control virtual machines in the data centers and, for example, in connection with cloud computing. A virtual center may further include a virtual data center (VDC) that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC. It is noted that where the term "Vblock" is used herein, it may also be generally understood as including and referring to any other appropriate software and/or component packages that provide network, compute and/or storage services for use in a virtualized computing environment. Management of a Vblock may be provided by an appropriate software element. For example, EMC's Ionix Unified Infrastructure Manager (UIM) may be integrated with Vblock and provide a management console for management of the Vblock package in accordance with operations and functionality further discussed in detail elsewhere herein.

Figure 2:
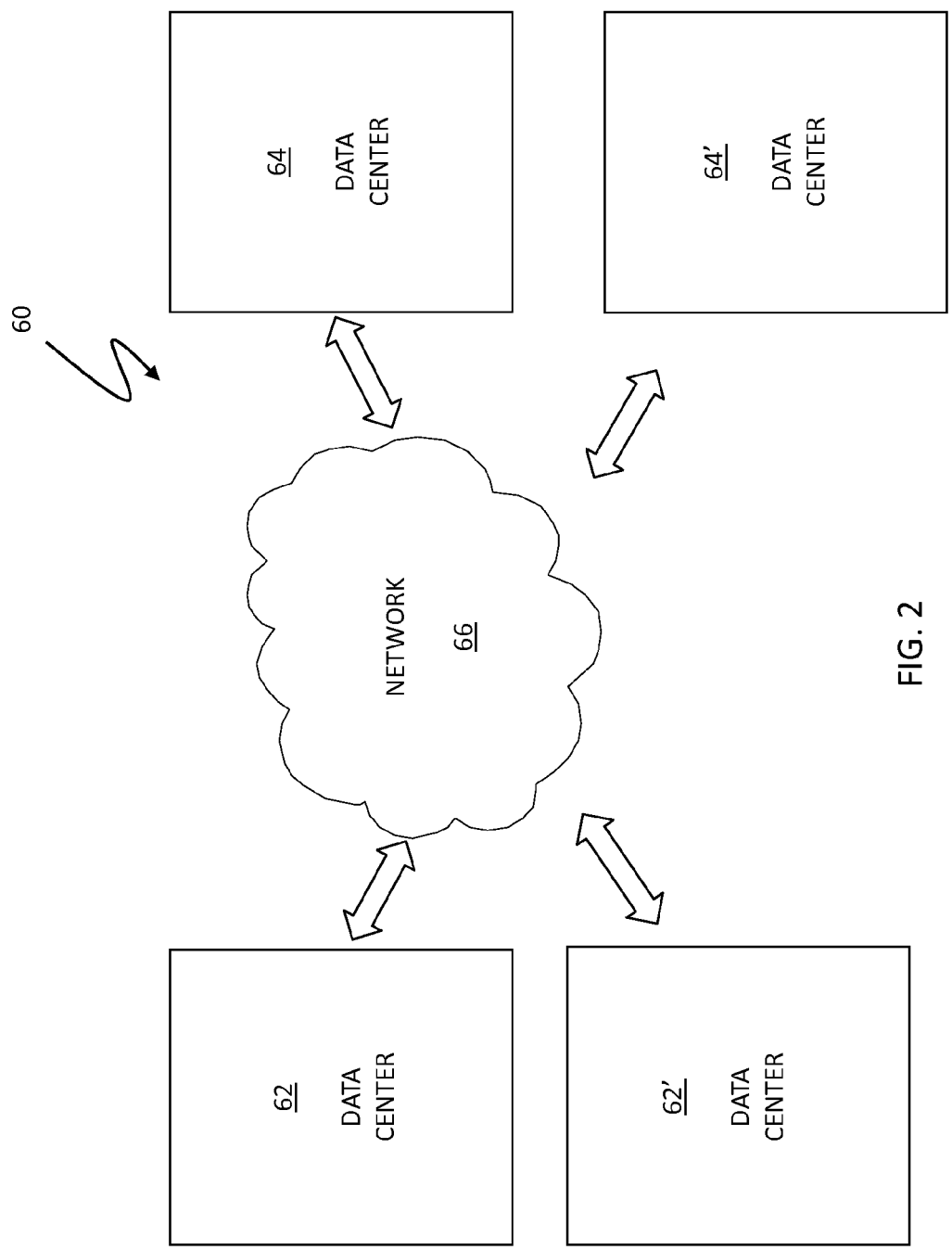
FIG. 2 is a schematic illustration showing a system that includes a plurality of data centers in communication via a network that may be used in accordance with an embodiment of the system described herein.

FIG. 2 is a schematic illustration showing a system 60 that includes a first data center 62 in communication with a second data center 64 via a network 66. Although embodiments are discussed principally in connection with two data centers 62, 64, any number of additional data centers, represented as data centers 62', 64', may be also be used in connection with the system described herein. Each of the data centers 62, 64 may include a plurality of devices and processors (see, e.g., FIG. 1) for executing applications using a plurality of VMs and which may be controlled and/or managed in connection with one or more virtual centers and/or VDCs. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 62, 64 may contain any number of processors and storage devices that are configured to provide the functionality described herein. The data centers 62, 64 may be configured similarly to each other or may be configured differently. The network 66 may be any network or similar mechanism allowing data communication between the data centers 62, 64. In an embodiment herein, the network 66 may be the Internet and/or any other appropriate network and each of the data centers 62, 64 may be coupled thereto using any appropriate mechanism. In other embodiments, the network 66 may represent a direct connection (e.g., a physical connection) between the data centers 62, 64.

In various embodiments, VMs may be migrated from a source one of the data centers 62, 64 to a destination one of the data centers 62, 64. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," and U.S. patent application Ser. No. 13/136,359 to Van Der Goot, filed Jul. 29, 2011, entitled "Active/Active Storage and Virtual Machine Mobility Over Asynchronous Distances," which are incorporated herein by reference and are assigned to the assignee of the present application. A product, such as EMC's VPLEX Metro and/or VPLEX Geo, may be used to manage VMs and other storage resources. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that where the term "VPLEX" is used herein it may also generally be understood as including and referring any other appropriate software and/or component packages that provide for coordinating and/or federating resources of disparate systems as a single pool of virtual resources, in particular, for example, a single pool of virtual storage.

Figure 3:
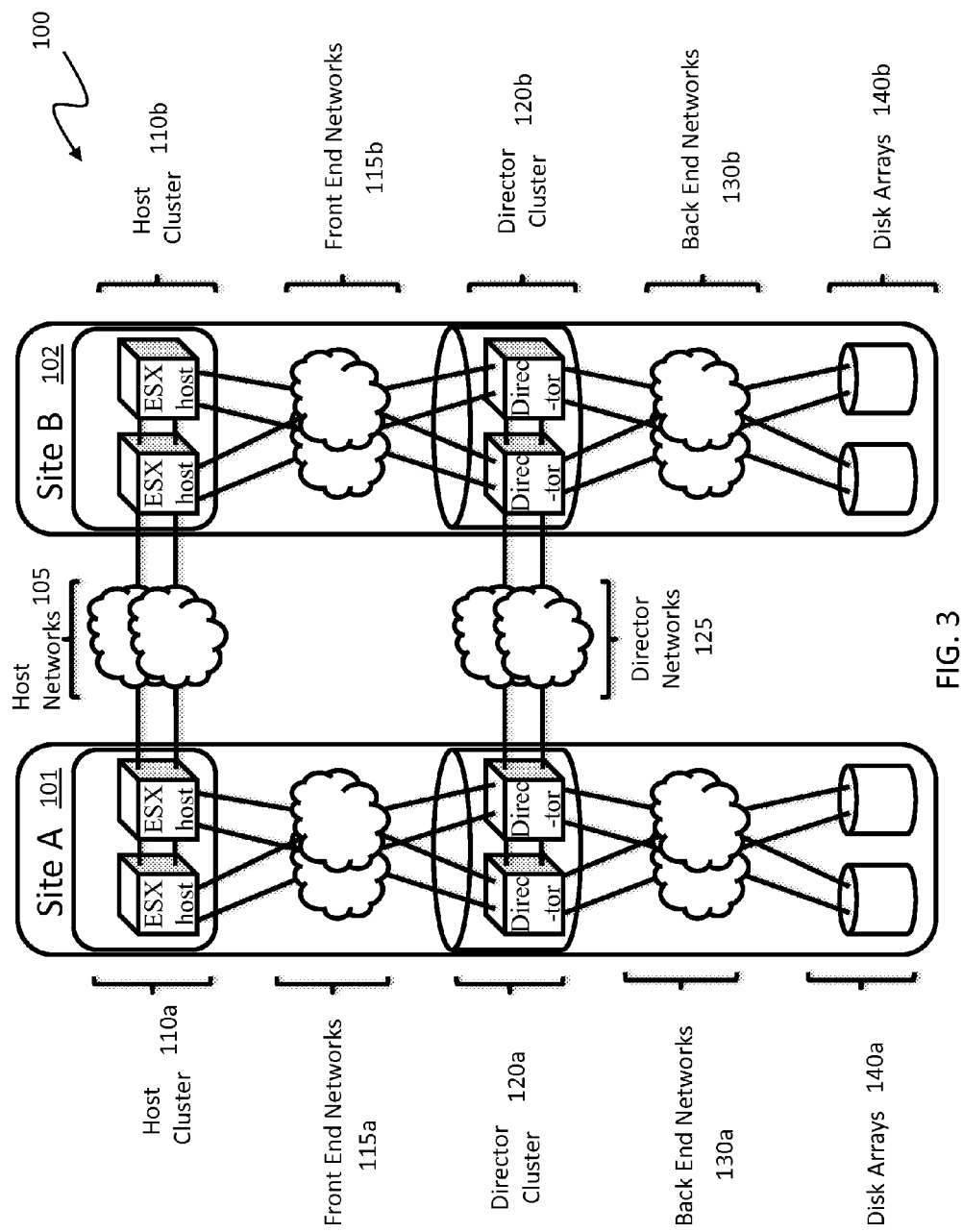
FIG. 3 is a schematic illustration showing a distributed storage system with multiple sites according to an embodiment of the system described herein.

FIG. 3 is a schematic illustration showing a distributed storage system 100 having multiple sites that may be used in connection with an embodiment of the system described herein. Although illustrated with two sites, Site A 101 and Site B 102, the system described herein may also operate in connection with additional sites. It is noted that components that are specifically discussed herein with respect to Site A 101 may be also be provided in Site B 102 (or any additional site), and vice versa where appropriate. The sites 101, 102 may include one or more hosts grouped in host clusters 110a,b, one or more directors grouped in director clusters 120a,b, and disk arrays 140a,b. Each host cluster 110a,b and director cluster 120a,b may each include software and/or other controllers or interfaces to control or administer operations in connection with described functions of the hosts and directors. In connection therewith, the components discussed herein in connection with the sites 101, 102 may, in various embodiments, be part of one or more data centers as further discussed elsewhere herein.

In an embodiment, each host cluster 110a,b may include ESX hosts in a vSphere cluster and director cluster 120a,b may include directors in a VPLEX cluster. Front end networks 115a,b may connect through host links to the host clusters 110a,b and through front end links to the director clusters 120a,b. One or more back end networks 230a,b may connect through back end links to the director clusters 120a,b and through array links to the disk arrays 140a,b. In an embodiment, the front and back end networks may be Fibre Channel networks. The front end networks 115a,b allow the hosts (or VMs running therein) to perform I/O operations with the host clusters 110a,b, while the back end networks 130a,b allow the directors of the director clusters 120a,b to perform I/O on the disk arrays 140a,b. One or more host networks 105, such as vSphere Ethernet networks, connect the ESX hosts in host clusters 110a,b. One or more director networks 125 connect the directors of the director clusters 120a,b.

Various types of failures, including network failures within a cluster, may result in behaviors that are further discussed elsewhere herein. It should be noted that the host cluster 110a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A virtual machine file system (VMFS) may be created on top of these distributed volumes allowing VMs that migrate between the sites to see the same file system in either site. It is also noted that, as illustrated and according to various embodiments, each site 101, 102 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous distance. For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the oldest dirty data between the clusters.

The above operations may work as long as the inter-cluster network is available. If the inter-cluster link fails, both clusters may contain dirty data that is unknown by the respective remote clusters. As a consequence of this failure, the director cluster may rollback the image of the data to a write order consistent point. In other words, the director cluster may rollback the image of the data to a point where it knows the data that is available on both clusters, or to a time where the write data was exchanged between both sites. The director cluster may also guarantee rollback to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. As noted elsewhere herein, known techniques may provide write order consistency by grouping writes in what are called deltas and providing the consistency on a delta boundary basis (see, e.g. U.S. Pat. No. 7,475,207 to Bromling et al.).

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be referred to herein as "vMotion" and may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. patent application Ser. No. 13/136,359 to Van Der Goot, as cited elsewhere herein.

Figure 4:
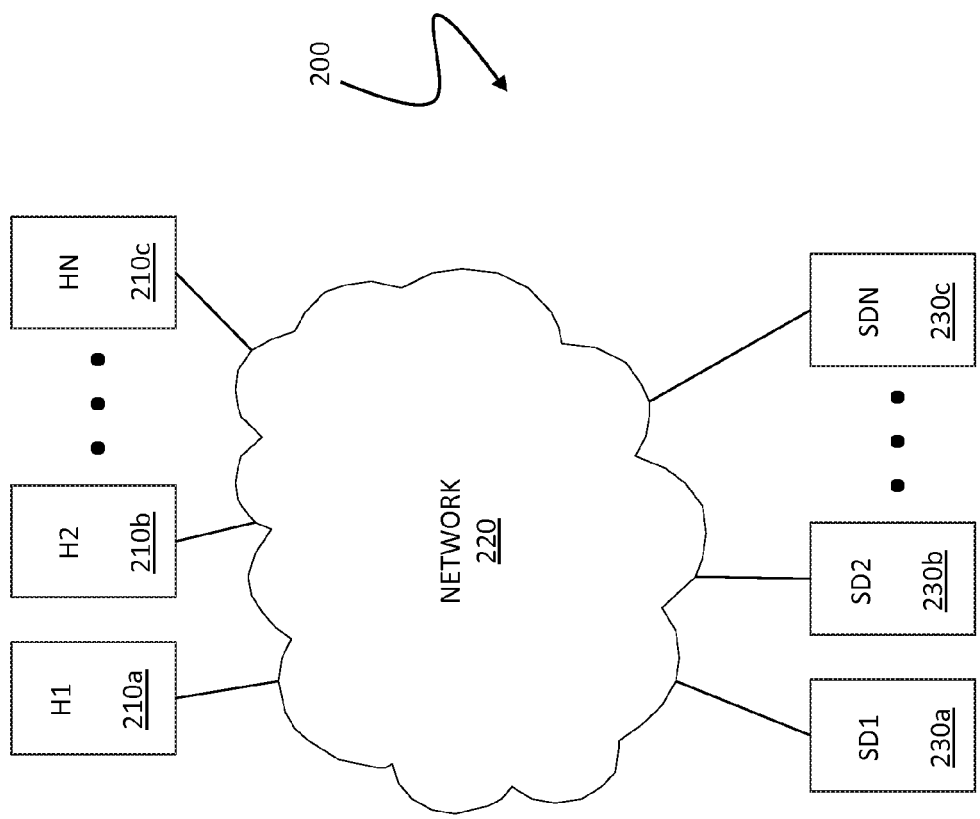
FIG. 4 is a schematic illustration showing a plurality of hosts coupled to a plurality of storage devices via a network according to an embodiment of the system described herein.

FIG. 4 is a schematic illustration 200 showing a network 220 that may include one or more of the networks, e.g. SANs, and provide a fabric coupling a plurality of host devices (H1-HN) 210*a-c* to a plurality of storage devices (SD1-SDN) 230*a-c*, as further discussed elsewhere herein. Each of the devices 210*a-c*, 230*a-c* may have a corresponding port that is physically coupled to switches of the SAN fabric used to implement the storage area network 220. The switches may be separately programmed by one of the devices 210*a-c*, 230*a-c* or by a different device (not shown). Programming the switches may include setting up specific zones that describe allowable data-path connections (which ports may form a data-path connection) and possible allowable initiator ports of those configurations. For example, there may be a zone for connecting the port of the host 210*a* with the port of the storage device 230*a*. Upon becoming activated (e.g., powering up), the host 210*a* and the storage device 230*a* may send appropriate signals to the switch(es) of the storage area network 220, and each other, which then allows the host 210*a* to initiate a data-path connection between the port of the host 210*a* and the port of the storage device 230*a*. Zones may be defined in terms of a unique identifier associated with each of the ports, such as such as a 64-bit world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Remote Data Facility products from EMC Corporation. For further discussion of Remote Data Facility and the use thereof in data recovery and storage techniques, see, for example, U.S. Pat. No. 5,742,792 to Yanai, et al., entitled "Remote Data Mirroring" and U.S. Pat. No. 7,779,291 to Yoder et al., entitled "Four Site Triangular Asynchronous Replication," which are incorporated herein by reference.

Techniques involving the configuration and use of storage area networks, including virtual storage area networks, are described, for example, in U.S. Pat. No. 8,028,062 to Wigmore et al., entitled "Non-Disruptive Data Mobility Using Virtual Storage Area Networks With Split Path Virtualization," which is assigned to EMC Corporation and is incorporated herein by reference, that discloses techniques for the creation of a SAN centric storage virtualization layer that allows data mobility and migration without disruption to one or more hosts servers attached to the SAN. Reference is also made to U.S. Pat. No. 7,441,023 to Benjamin et al., entitled "Method and Apparatus for Modeling and Analyzing MPLS and Virtual Private Networks;" U.S. Pat. No. 7,720,003 to Benjamin et al., entitled "Model-Based Method and Apparatus for Determining MPLS Network Properties;" and U.S. Pat. No. 7,783,778 to Benjamin, entitled "Model-Based Method and Apparatus for Determining Virtual Private Network Topologies," which are assigned to EMC Corporation and are all incorporated herein by reference, that disclose various techniques for discovering and identifying network properties and topologies in a network represented by a model.

Figure 5:
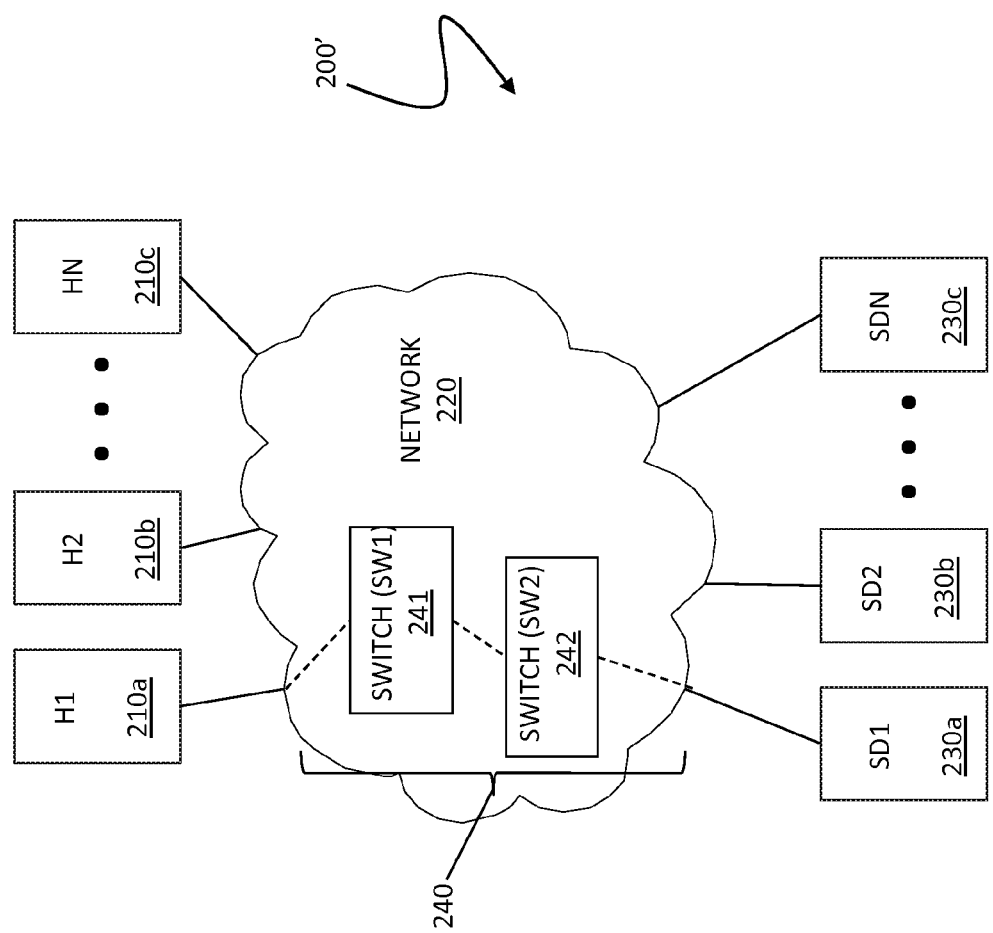
FIG. 5 is a schematic illustration of an embodiment of the network shown in FIG. 4 including multiple switches providing an I/O path between a host and a storage device in connection with an embodiment of the system described herein.

FIG. 5 is a schematic illustration 200' showing multiple SAN switches of a network 220, like that of FIG. 4, that may be used in connection with an embodiment of the system described herein. In the illustrated embodiment, the network 220 is shown with two switches, switch 241 (SW1) and switch 242 (SW2), that are used in connection with an I/O data path 240 from the host 210a to the storage device 230a. In various embodiments, the switches 241, 242 may include physical and/or logical devices. Although two switches are shown, more than two switches and/or other appropriate elements of a network fabric, including other types network elements and/or one or more compute elements, may be used in connection with the providing of I/O data paths from one or more of the hosts 210a-c to one or more of the storages devices 230a-c in connection with path performance data collection according to the system described herein.

The selection and/or identification of the I/O path 240 may be performed according to multiple selection factors and using known path selection techniques. Reference is made, for example, to U.S. Pat. No. 7,688,753 to Zimran et al., entitled "Selection of a Data Path Based on One or More Performance Characteristics of a Computer System," which is assigned to EMC Corporation and is incorporated herein by reference and which discloses techniques for data path selection based on performance characteristics of a computer system using a path selection module. Reference is also made to U.S. Pat. No. 6,434,637 to D'Errico, entitled "Method and Apparatus for Balancing Workloads Among Paths in a Multi-Path Computer System Based on the State of Previous I/O Operations," which is assigned to EMC corporation and is incorporated herein by reference and which discloses techniques for selecting one of at least two I/O data paths for transmission of the next I/O operation based upon a state of previously assigned I/O operations queued for transmission over the I/O paths.

It is further noted that the system described herein may be used in connection with simulation of data storage systems for evaluation purposes. For example, I/O data paths of simulated storage system configurations may be evaluated to determine preferred configurations and/or identify potential problems of a possible I/O data path and elements thereof. Suitable data storage system simulation tools that may be used in connection with the system described herein may include systems and methods like that disclosed in U.S. Pat. No. 7,392,360 to Aharoni et al., entitled "Method and System for Capacity Planning and Configuring One or More Data Storage Systems," U.S. Pat. No. 7,292,969 to Aharoni et al., entitled "Method and System for Simulating Performance on One or More Storage Systems," and U.S. patent application Ser. No. 13/065,806 to Smirnov et al., filed Mar. 30, 2011, entitled "Write Pacing Simulation Tool," which are all assigned to EMC Corporation and which are all incorporated herein by reference.

Figure 6:
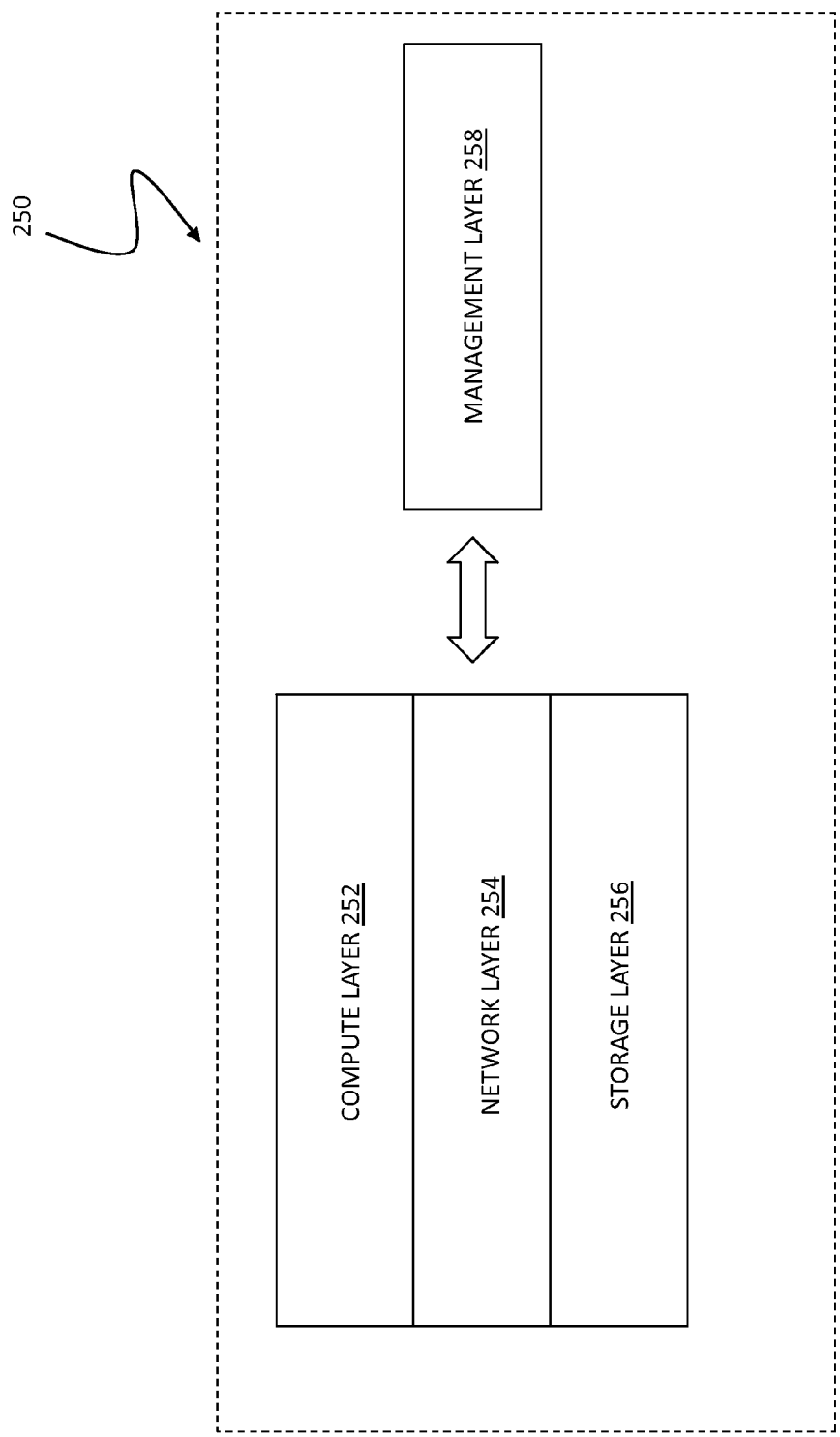
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute and storage layers 252, 256 within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM), as further discussed elsewhere herein.

Figure 7:
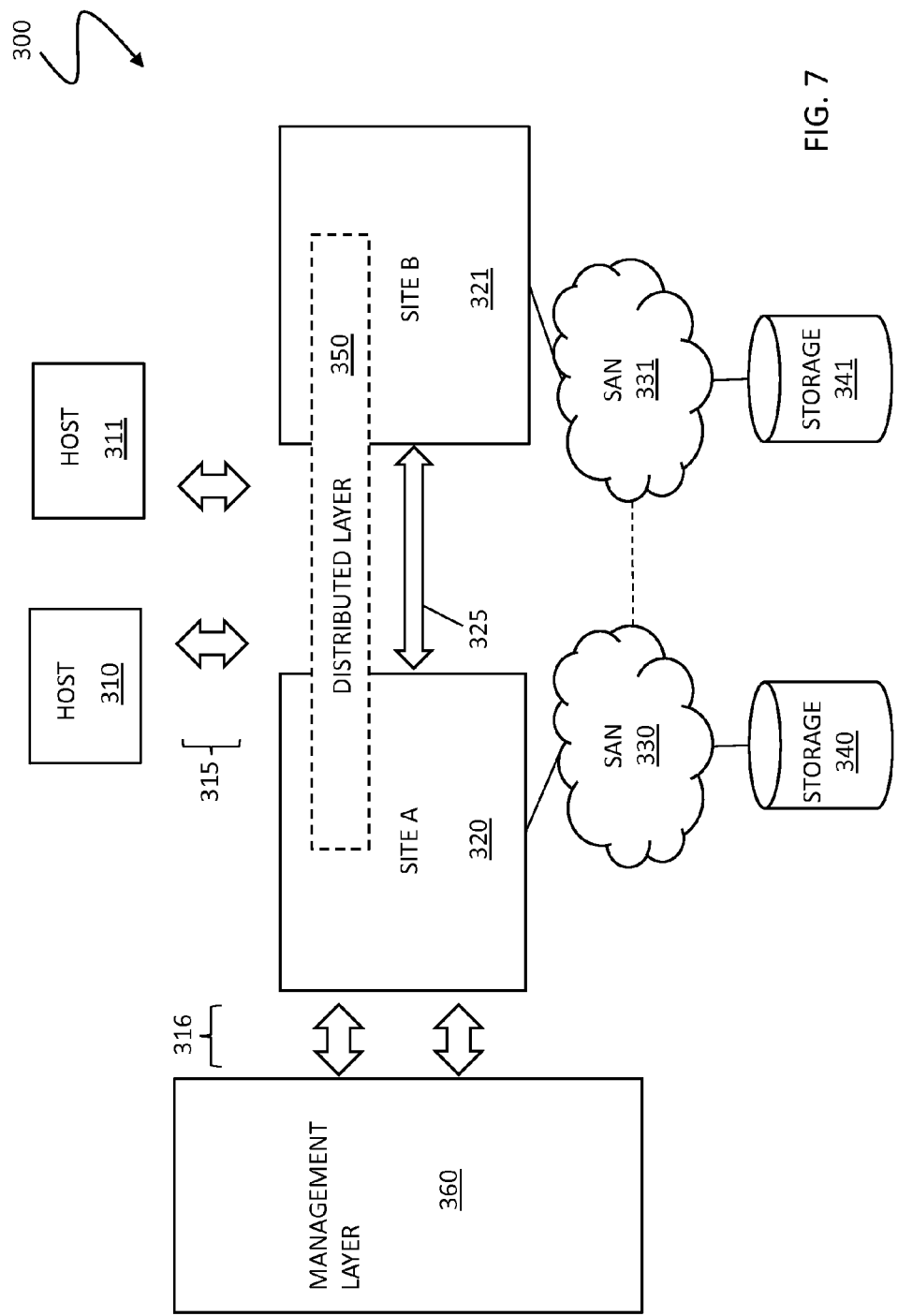
FIG. 7 is a schematic illustration showing a more detailed view of a distributed processing system that may be used in connection with an embodiment of the system described herein.

FIG. 7 is a schematic illustration showing a more detailed view of a distributed processing system 300 that may be used in connection with an embodiment of the system described herein. The system may include a collection of multiple compute sites, such as site A 320 and site B 321, that may each include one or more directors (access nodes) like the directors 20 discussed elsewhere herein. Although two compute sites are shown, more than two compute sites may be used and operated in connection with the system described herein. As further discussed elsewhere herein, the sites 320, 321 may be located geographically distant from each other. The sites 320, 321 may be connected via an interconnection 325, such as an IP network, PCI bus, FC network and/or any other type of network. Hosts 310, 311 are shown that may communicate with the compute sites 320, 321, as further discussed elsewhere herein. The hosts 310, 311 may be representative of any number of hosts that may perform I/O access operations in the distributed processing system 400.

The multiple compute sites 320, 321 may together be engaged in a joint operations in connection with I/O requests of one or more hosts, such as the host 310. The joint operations may provide for managing access to the data in connection with searching operations in accordance with the system described herein and/or other appropriate distributed processing operations. The sites 320, 321 may be coupled via SANs 330, 331 to storage resources 340, 341. The storage resources 340, 341 may be located in proximity to the sites 320, 321 and/or may be remotely located and accessed. In an embodiment, the SANs 330, 331 may be separate networks. Alternatively, in another embodiment, the SANs 330, 331 may be part of the same network, an embodiment shown represented by a dashed line connecting the SANs 330, 331. In various embodiments, the joint operations may include multiple, independent sub-computations and may include operations of a clustered small computer system interface (SCSI) device corresponding to use of external storage nodes that may be accessed by one or more of the sites 320, 321.

A distributed layer 350 is shown schematically as a system of the sites 320, 321 that may be distributed across the sites 320, 321 in connection with processing of one or more access nodes. The distributed layer 350 may function like a virtual center that provides for control of managing, monitoring, provisioning and migrating virtual machines. The distributed layer 350 may provide for managing deployment of virtual machines at one or more data centers, like the sites 320, 321, and may operate to control virtual machines at the sites 320, 321 in connection with cloud computing including both internal and external cloud infrastructures and hybrids thereof. The system described herein may operate in connection with a VPLEX product produced by EMC Corporation of Hopkinton, Mass. and/or a vSphere product produced by VMware Inc. of Palo Alto, Calif., as further discussed elsewhere herein.

According to the system described herein, a management (or orchestration) layer 360 may be provided that provides policy driven management for controlling access in connection with servicing I/O requests among the sites 320, 321 in a cloud computing federated environment. I/O requests from the hosts 310, 311 may be received by one or more of the sites 320, 321 over a communication link 315 that may be a network, such as the Internet and/or other suitable communication link. The management layer 360 may be coupled to the sites 320, 321, including the distributed layer 350, via a communication link 316 that may be the same as or a different network than the communication link 315. The management layer 360 may control and implement policies and/or other information for the servicing I/O requests at one or more of the sites 320, 321, as further discussed elsewhere herein. In various embodiments, the management layer 360 may be a software layer that is distributed across the sites 320, 321 like the distributed layer 350 and/or may be integrated in connection with an independent compute entity coupled to the sites 320, 321. The management layer 360 orchestrates, based, for example, on policies and/or other information fed from manual and dynamic inputs, where compute and storage processes may reside and provides non-disruptive control for the servicing of I/O requests that is fully enabled by a dynamic active/active storage platform.

Figure 8:
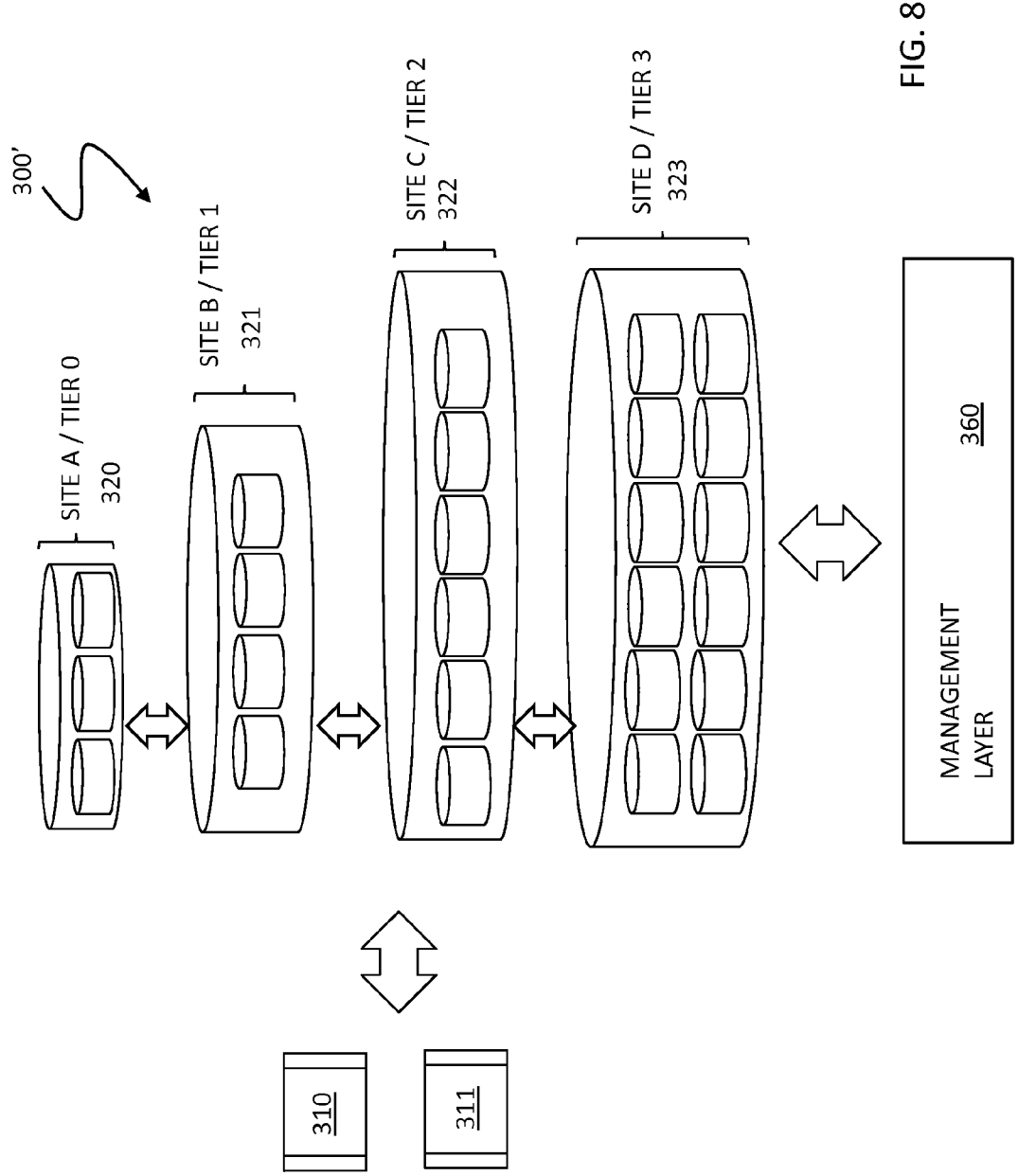
FIG. 8 is a schematic illustration showing a distributed processing system that may be used in connection with another embodiment of the system described herein.

FIG. 8 is a schematic illustration showing a distributed processing system 300' according to another embodiment of the system described herein. Multiple compute sites, including the sites A, B 320, 321 as well as sites C, D 322, 323, are illustrated. In the illustrated embodiments, the sites A, B, C and D may further correspond to different types of storage tiers 0, 1, 2, 3 within a cloud computing configuration that may handle I/O requests received from the hosts 310, 311 that are passed to the tiers 0-3 with the servicing of the I/O requests being orchestrated by the management layer 360 according to one or more policies. As illustrated, the tiers 0-3 of the sites A-D 320-323 may have different processing characteristics and/or available storage or other resources.

In an embodiment, the designation of tiers at specific sites may be rotated, and/or otherwise periodically modified, for example, based on different times of the day. That is, for example, a site designated as tier 0 may be a preferred site for processing in a cloud computing environment during a preferred local time, such as in the middle of the night, but become later designated as a different tier, for example tier 3, during a busy processing time in the middle of the day. In other embodiments according to the system described herein, tiers 0-3 may correspond to a type of resource. For example, tier 0 may correspond to a fast and easily accessible storage resource, such as flash memory, and tier 3 may correspond to inexpensive/large capacity memory. Other types of processing characteristics for tier designation may also be used in connection with the system described herein. Different type of data may be stored at the respective tiers 0-3 of the sites A-D 320-323. For example, data that is frequently access may be stored at tier 0, whereas archived data may be stored at tier 3.

Figure 9:
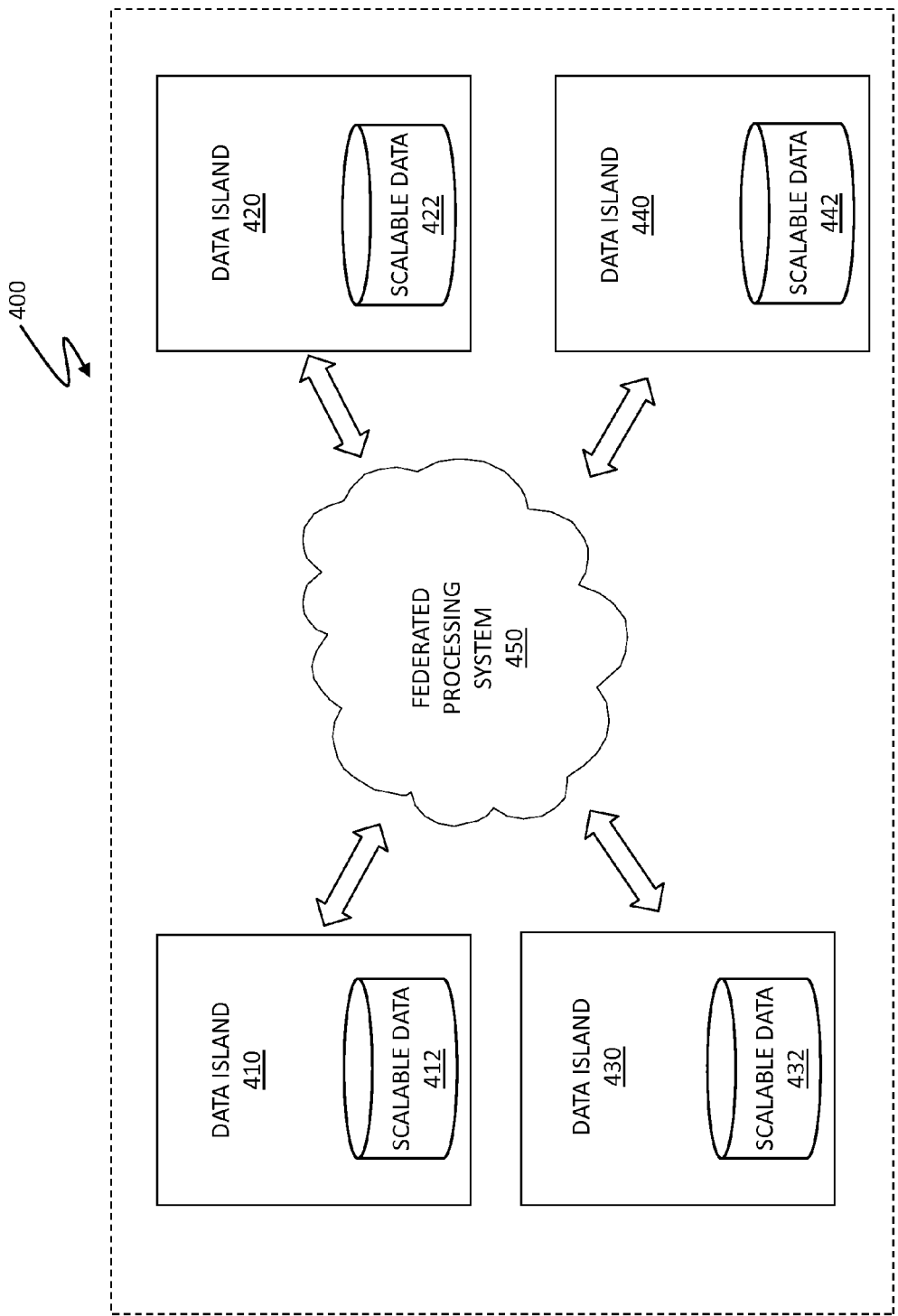
FIG. 9 is a schematic illustration showing a federated environment in which multiple data islands may be coupled in a distributed processing system according to an embodiment of the system described herein.

FIG. 9 is a schematic illustration showing a federated environment 400 in which multiple data islands 410, 420, 430 and 440 may be connected in a distributed processing system according to an embodiment of the system described herein. Each of the data islands 410, 420, 430, 440 may include or one or more of the data centers and/or virtual data centers, as discussed elsewhere herein, and may be distributed across multiple sites and/or tiers and coupled via a federated processing system 450. Although four data islands 410, 420, 430, 440 are shown, any number of data islands may be used in connection with the system described herein. In the federated environment 400, I/O requests may be passed among different processing elements of the federated environment in a manner that is transparent to the host that issued the I/O request. That is, the host may unaware of the actual processing element of the federated environment that processes the I/O request.

According to an embodiment of the system described herein, any one or more of the data islands 410, 420, 430, 440 may efficiently search for data and/or other objects across the federated environment 400 and access details of any objects while minimizing the data replicated across all of the data islands. In accordance with the system described herein, scalable data may be replicated across all of the data islands and allow a local search for any object across the federated environment 400. In the illustration, scalable data sections 412, 422, 432, 442 are shown in connection with each of the data islands 410, 420, 430, 440. The scalable data may be a subset of data and/or configured meta data that stores a limited subset of data that enables the local search, at each data island 410, 420, 430, 440, for objects stored in the federated environment 400. As further discussed in detail elsewhere herein, the scalable data may include semantic model statements, such as, for example, Resource Descriptor Framework (RDF) statements, and/or portions thereof.

In an embodiment, each of the scalable data sections 412, 422, 432, 442 may store the data subset and/or metadata that enables searching for all objects stored in the federated environment 400. In other embodiments, though, it is noted that the system described herein may be applied in cases where each data island stores scalable data for objects stored in at least one other data island, rather than necessarily storing scalable data for all objects of the federated environment.

The scalable data in the sections 412, 422, 432, 442 may store sufficient information to identify the location of a particular object being searched for, and the request for the particular object then be automatically redirected to the appropriate location where the object is stored to service the request. It is noted that, in various embodiments, the request may correspond to processing of storage, compute and/or network resource requests according to the system described herein. In an embodiment, the redirecting of the request may be performed using a RESTful (representational state transfer) interface. Accordingly, the scalable data that is replicated across the data islands of the federated environment 400 may be minimized and provide for minimal network overhead. The scalable data may be easy to configure and maintain while providing for local search capability for multiple objects stored across the federated environment 400. In an embodiment, the system described herein may be used in connection with EMC's ProSphere product.

Figure 10:
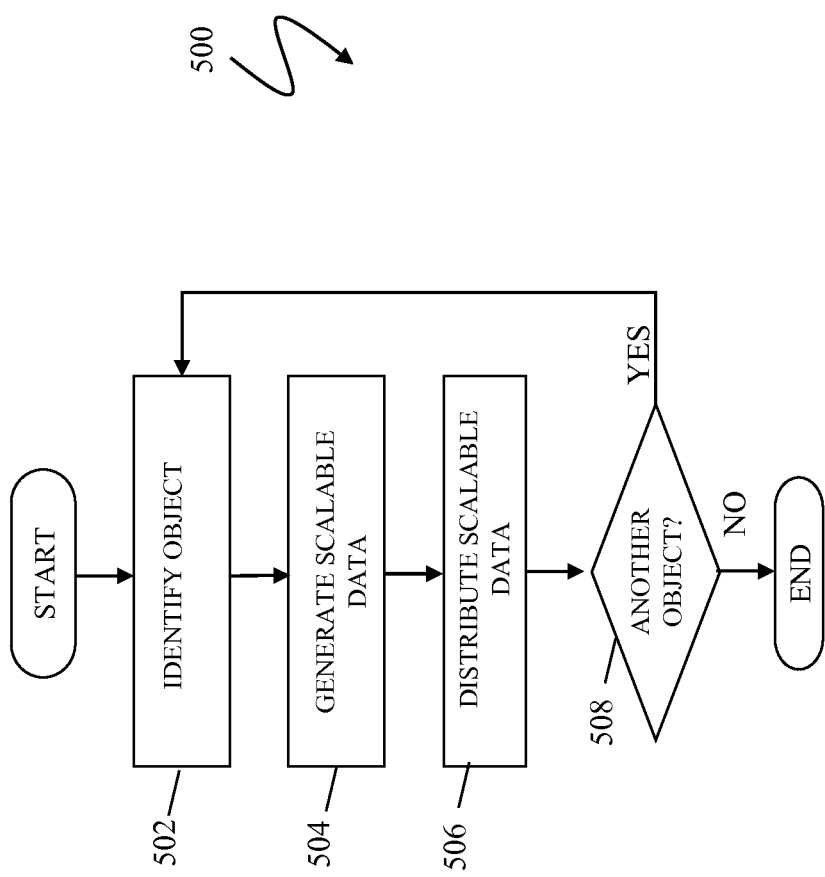
FIG. 10 is a flow diagram showing processing for storing scalable data across multiple data islands for multiple objects of a federated environment according to an embodiment of the system described herein.

FIG. 10 is a flow diagram 500 showing processing for storing scalable data across multiple data islands for multiple objects of a federated environment according to an embodiment of the system described herein. At a step 502, an object of the federated environment is identified for which scalable data is to be generated. After the step 502, processing proceeds to a step 504 where the scalable data for the object is generated. In an embodiment, the scalable data may include metadata for an object that includes identification information (e.g., name, resource type, such as storage array, host switch etc., model and/or vendor) and/or storage location, for example, among other resource management information that may facilitate searching for the object. After the step 504, processing proceeds to a step 506 where the scalable data generated for the object is stored across multiple data islands of the federated environment. In this way, in response to a search request for a particular object received at any of the data islands, a local search of the scalable data may be performed at the data island where the request is received, and subsequently redirected, as appropriate, as further discussed elsewhere herein.

After the step 506 processing proceeds to a test step 508 where it is determined whether there is another object of the federated environment for which scalable data is to be generated and distributed across the multiple data islands. If yes, then processing proceeds back to the step 502. It is noted that in various embodiments, one or more of the steps above may be performed in connection with multiple objects. For example, scalable data for more than one object may be generated before the scalable data for those objects is distributed to other data islands. Furthermore, it is also noted that identifying, creating and distributing the scalable data for one or more objects may be performed when the object is generated, as part of an automatic background processing task, as manually initiated by a user and/or administrator and/or in connection with other appropriate processing. If, at the test step 508, it is determined that there are no further objects at this time for which scalable data is to be generated and distributed, then processing is complete.

Figure 11:
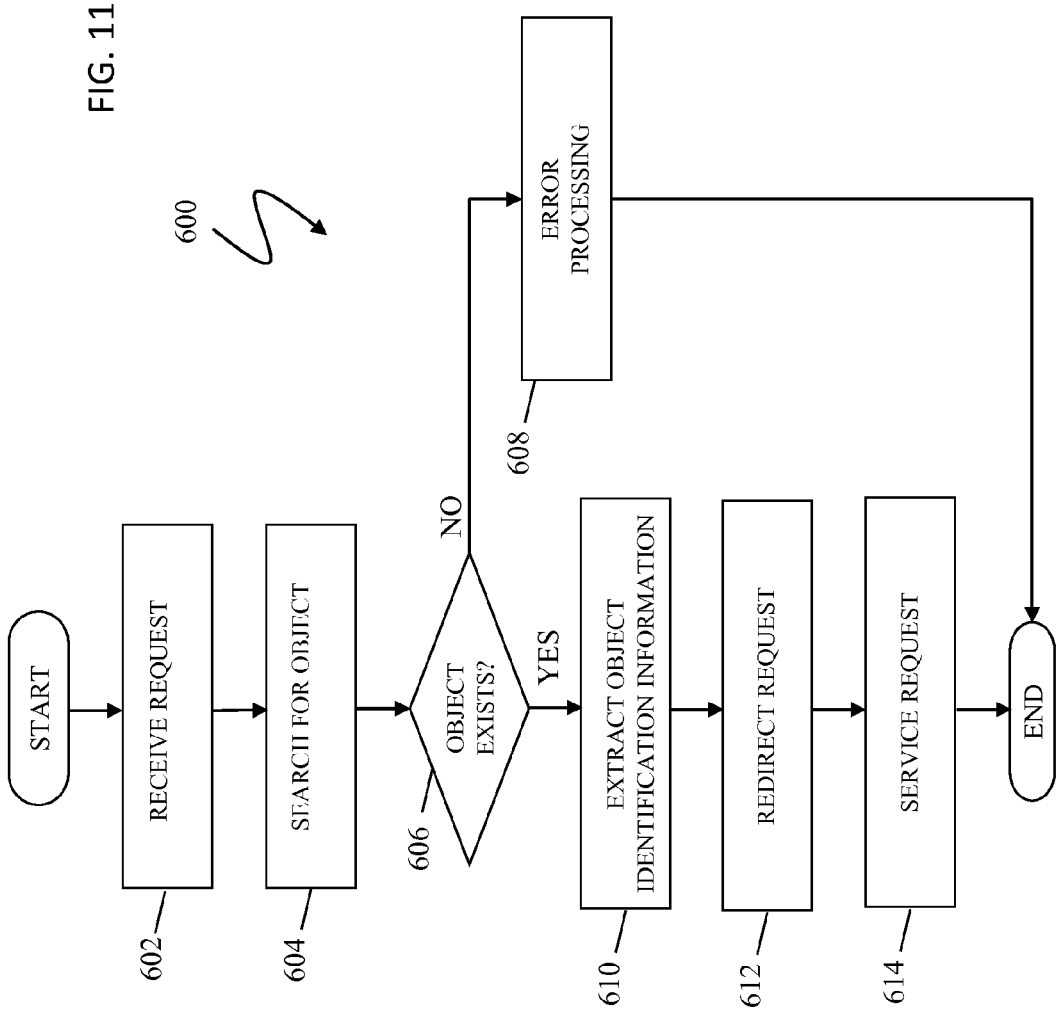
FIG. 11 is a flow diagram showing processing for searching for an object using the scalable data stored across the multiple data islands of the federated environment according to an embodiment of the system described herein.

FIG. 11 is a flow diagram 600 showing processing for searching for an object using the scalable data stored across the multiple data islands of the federated environment according to an embodiment of the system described herein. At a step 602, a search request for an object is received at a data island. After the step 602, processing proceeds to a step 604 where the data island is locally searched to locate the object. It is noted that the local search for the object at the data island may include a search for the object itself on the data island and/or a search of scalable data stored on the data island, as further discussed herein. After the step 604, processing proceeds to a test step 606 where it is determined whether information of the object exists on the data island where the request is received. It is noted that the determination may include determining whether the object itself is on the data island and/or whether information of the object is available from the scalable data stored on the data island. If not, then processing proceeds to a step 608 where an error message is returned and/or other message is returned indicating that the object is not stored and/or available in the federated environment. After the step 608, processing is complete.

If, at the test step 606, it is determined that information of the object exists in the scalable data of the data island, then processing proceeds to a step 610. At the step 610, information from the scalable data is extracted that identifies the object, particularly the location where the object is stored in the federated environment. After the step 610, processing proceeds to a step 612 where the request is redirected to the appropriate data island where the object is located in order for the request to be processed locally where the object is located in the federated environment. It is noted that where the object is determined to be locally at the initial data island where the request is initially received, then redirecting the request to another data island is not required. After the step 612, processing proceeds to a step 614 where the request for the object is processed locally where the object is located. After the step 614, processing is complete.

In other embodiments, the system described herein may further be used in connection with the use of semantic technologies (e.g., Semantic Web) for performing search processing. Semantic technologies may be used to model a storage environment and network as well as provide a model of a system being deployed (e.g., classes, attributes and relationships) and the storage environment state (e.g., configuration, topology, alerts). Semantic technologies provide a conceptual description or modeling of information that is implemented in web resources, using a variety of syntax formats. Semantic technology models may be based on the concept of making statements about resources (in particular Web resources) in the form of relational expressions, such as subject-predicate-object expressions, in connection with enabling searching and/or otherwise identifying those resources. Additionally, linked data principles may allow for the federation of information across data centers and the efficient linking and merging of disparate data, as further discussed elsewhere herein.

Alternatively and/or additionally, in various embodiments, features of the system described herein may be advantageously used in connection with management of data sets in a cloud computing and/or federated environment. In an embodiment, the system described herein may be used in connection with cloud processing of big data sets. The term "big data," as used herein, may be generally defined to describe data sets so large and complex that they become difficult to work with using on-hand database management tools. Difficulties of working with big data sets may include data capture, storage, search, sharing, analysis and visualization. In an embodiment, the system described herein may apply where processing of a big data set would exceed a particular threshold (e.g., a data amount in terms of processing time, CPU cycles etc.) in connection with a local database management tool. The threshold may be determined according to particular processing equipment and/or according to other circumstances. Specifically, the threshold may be determined as a processing threshold that is exceeded were the data processed by the local database management tool. The system described herein enables the persistent storage of semantic technology statements for big data sets for processing in a cloud computing and/or federated environment, as further discussed in detail herein.

Domain models of storage networks and storage devices may be defined in a proprietary manner using proprietary models and/or known technologies (e.g., a relational database management system (RDBMS)). Technologies are known for managing data centers and providing storage resource management (SRM) functions, including semantic web technologies such as Resource Description Framework (RDF), OWL Web Ontology Language (OWL), SPARQL Protocol and RDF Query Language (SPARQL). SRM information architectures may be based on various standards and principles, such as those defined by the World Wide Web Consortium and including, for example, RDF, OWL and Linked Data models. In an embodiment, the SRM information architecture of the system described herein may be used in connection with EMC's ProSphere product.

In an embodiment, in an RDF model, URIs (uniform resource identifier), or more specifically URI references, may be used to identify the elements (subject, predicate, object) in an RDF statement. In SRM, this results in statements which describe a storage array and multiple statements may be created to describe the SAN resources that the SRM system has discovered or been made aware. The statements may then be stored in persistent storage (persisted) in an RDF store and/or database of a distributed processing system, such as a cloud processing (storage) system and/or other federated environment. The statements may then be queried using a query language, such as SPARQL for RDF (similar to SQL).

Figure 12:
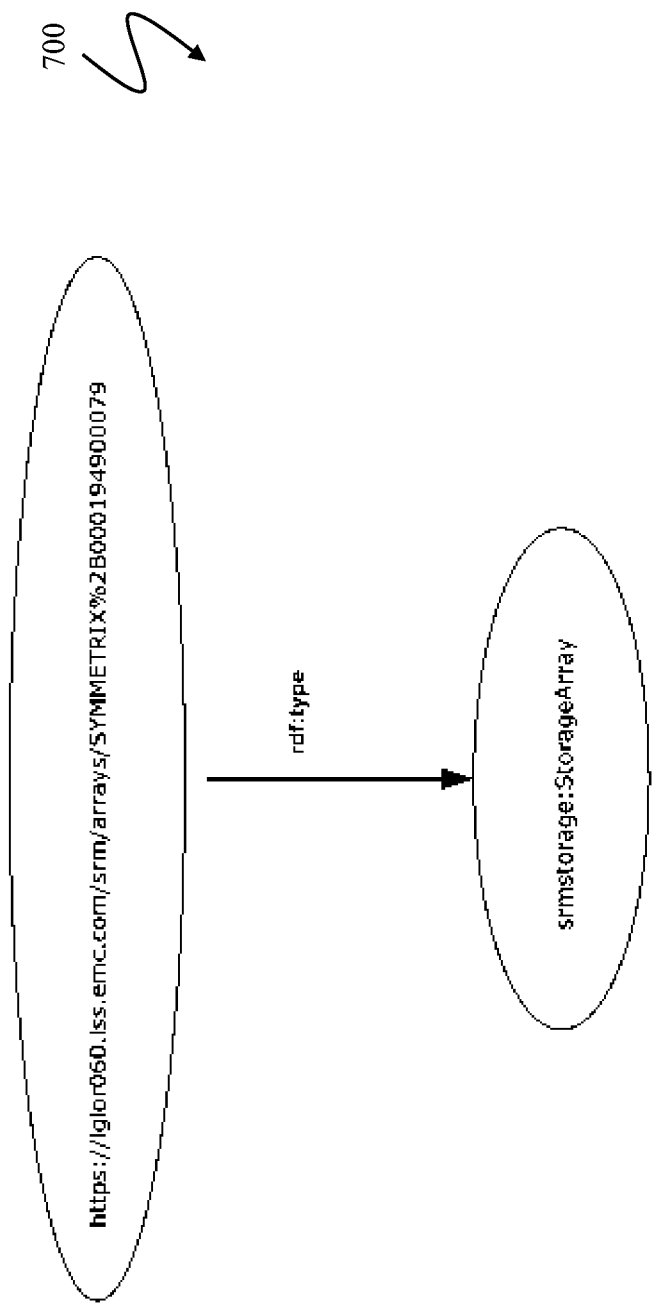
FIG. 12 is a schematic illustration of a semantic technology statement for an example storage resource management (SRM) resource that may be used in connection with an embodiment of the system described herein.

FIG. 12 is a schematic illustration 700 of a semantic technology (RDF) statement for an example SRM resource that may be used in connection with an embodiment of the system described herein. In an embodiment, the RDF statement may include subject, predicate and object elements, such as elements like that provided below by way of example only:
Subject: https://lglor060.lss.emc.com/srm/arrays/SYMMETRIX %2B000194900079
Predicate: rdf:type
Object: srmstorage:StorageArray.
The example statement describes a storage array and may be presented in graphical form.

Figure 13:
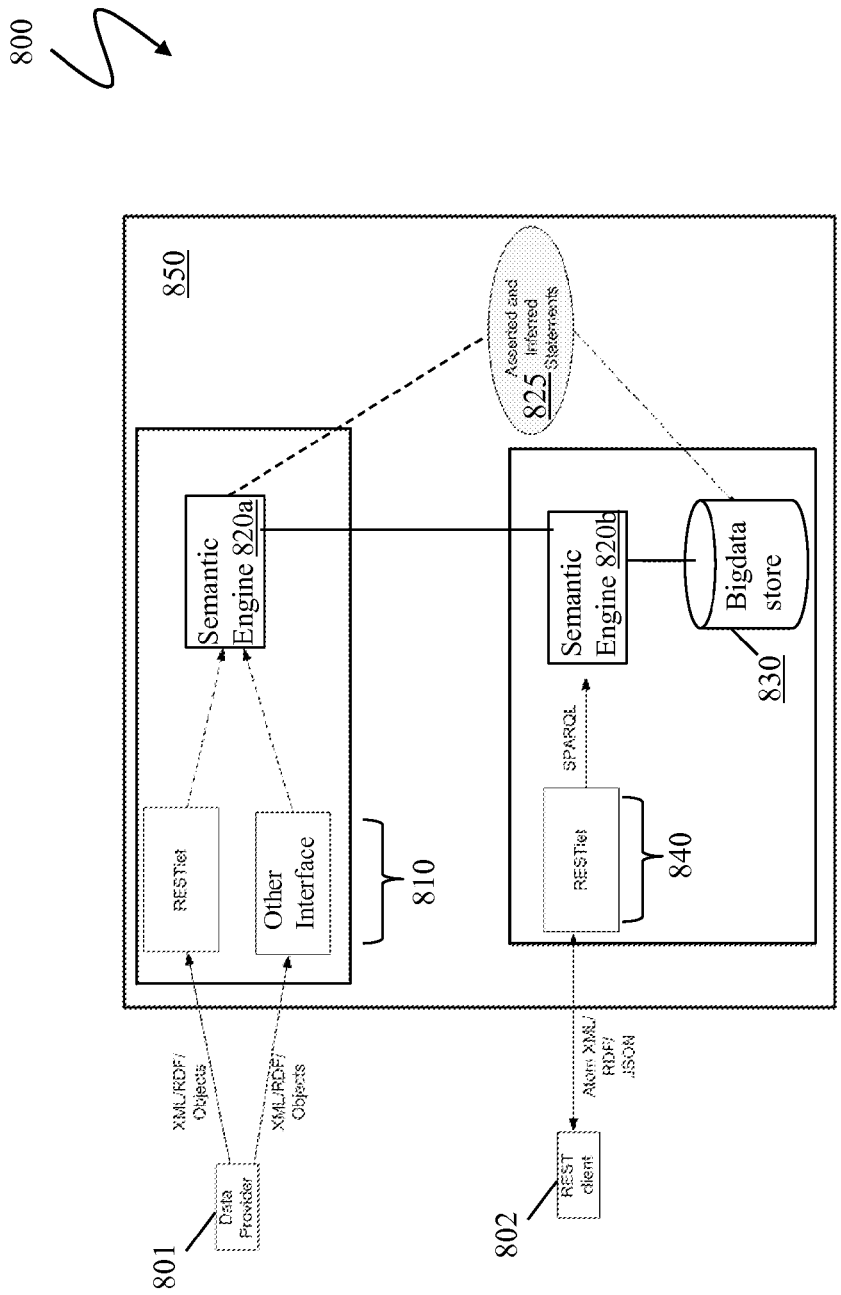
FIG. 13 is a schematic illustration of an SRM information integration architecture and depicting the flow of information in the SRM architecture according to an embodiment of the system described herein.

FIG. 13 is a schematic illustration of an SRM information integration architecture 800 and depicting the flow of information in the SRM architecture according to an embodiment of the system described herein. Data may be received at an SRM system 850 from one or more providers 801 (sources) (e.g. discovery appliance, manually via API or UI) via one or more interfaces 810 that may, for example, be one or more implementations of a RESTful network endpoint (e.g., RESTlet) and/or other interface. Using a semantic engine 820a, the data received may all be normalized to an appropriate semantic technology model, such as RDF and/or OWL, regardless of the representation received (e.g. CSV, XML, JSON, objects). The data may be transformed procedurally in Java code and through semantic technology inferencing (e.g., using RDF schema (RDFS), OWL inferencing etc.), for example into semantic technology statement form, such as an RDF statement. The transformed data 825 may then be persisted in an embedded semantic technology data (e.g., RDF) store. In an embodiment, the data store 830 may be referred to as a big data store. The data store 830 may be distributed across a plurality of sites, such as data centers, of a cloud processing environment, as further discussed elsewhere herein. The transformed data 825, stored in the data store 830, may then be queried using an appropriate method, such as SPARQL and/or native Java RDF-based methods, via a semantic engine 820b (that may be the same as or different from the semantic engine 820a) and provided via an interface 840 (e.g., RESTlet) to one or more REST client 802 in a desired representation (e.g., Atom XML, RDF/XML, JSON, CSV).

It is noted that the system described herein may be used to map, using the semantic technology (e.g., RDF and/or OWL), common information model (CIM)-based models exposed by storage management initiative specification (SMI-S) providers. In an embodiment, the system described herein may be used in connection with EMC's ProSphere product that may use RDFS and OWL inferencing and SPARQL to transform source models that are based on CIM into an SRM RDF-based information model.

In an embodiment, the data store 830 may be able to store many semantic technology model (e.g., RDF) statements (e.g., up to 20 billion) within a single database depending on the mode chosen. In an embodiment, the data store 830 may be a series of highly optimized B-Tree indices which persist the statement components as integer representations. There may be two primary modes in which the database can be configured to run in: read-write (RW) and write-once read-many (WORM). In RW mode, statements may be removed and space reclaimed, whereas in WORM mode, the database may act as a long term journal, where statements are only marked for deletion but are not physically deleted. In both modes retention settings may be applied which configure how much history the database should persist. In an embodiment, the system described herein may be used in connection with a Bigdata® product by Systap, LLC of Washington, D.C. For example, the underlying B-Tree technology may be used in a big data SparseRowStore implementation which may be a column-store based database, for example, similar to Cassandra and CouchDB products from the Apache Software Foundation.

FIG. 14 is a flow diagram 900 showing processing steps of an SRM system to store data (e.g., big data) in a semantic technology statement form according to an embodiment of the system described herein. At a step 902, data, such as a big data set, is received at the SRM system from one or more providers. After the step 902, processing proceeds to a step 904 where the data is transformed and/or otherwise converted into a semantic technology statement form, for example, using RDF and/or OWL protocols and/or inferencing, for example. After the step 904, processing proceeds to a step 906 where the semantic technology statement is persisted in a data (big data) store. After the step 906, processing is complete.

FIG. 15 is a flow diagram 950 showing processing steps of an SRM system for processing a query for data (e.g., big data) stored according to an embodiment the system described herein. At a step 952, a query from a client is received in connection with the data (big data). After the step 952, processing proceeds to a step 954 where the query is converted into a semantic technology query, using for example such as SPARQL and/or native Java RDF-based methods. After the step 954, processing proceeds to a step 956 where the query is serviced using the data store and the results presented via an interface. After the step 956, processing is complete.

There are two provenance modes which the system described herein may be configured to support: statement identifiers and quads. Provenance is a term used with semantic technology applications to describe the characteristics of the source of statements or sets of statements, such as creator, create/update date, software agent. With statement identifiers (SID) turned on, the database may persist a unique identifier for each statement, and this statement identifier may be used to identify other statements, such as the author of a statement. The quads mode is more advanced in that it allows a big data system to support named graphs and/or the naming of a collection of RDF statements.

When run in a clustered configuration, big data services may dynamically "shard" or partition the data across the nodes in the cluster. This enables the dynamic addition and removal of cluster nodes providing a highly available scale-out solution. Simple reads from the indices may generally be serviced quickly (e.g., within 10 ms), whereas most SPARQL queries are serviced within one second. Writes to big data are dependent on the size of the transaction and whether inference has been enabled but are, in an example, may generally be in the range of 5K-30K statements per second.

The system described herein further provides the ability to scale-up as well as scale-out. Because each big data instance may essentially be treated as an embedded database with one file (journal) per database, multiple databases may be created per Java process or OS instance. This allows partitioned or unrelated data to be written concurrently within a single physical or virtual appliance. The concurrency model for big data is to allow multiple concurrent readers and writers with one writer allowed to write to the indices at once. As the write rate is in the order of 5K-30K statements per second, queued writers do not wait for a significant amount of time, depending on the size of transactions. In an embodiment, the big data readers may not block other readers or writers in that the store may support Multi-Version Concurrency Control (MVCC). Each set of statements committed in a transaction may be assigned a timestamp, so that readers read using the latest timestamp (and/or a specified timestamp).

The system described herein may support various types of interfaces, including the open-source Sesame SAIL interface which is a common Java RDF store framework. Most RDF stores written in Java support this interface as it allows for pluggable storage and inference capabilities allowing developers to move been implementations of store and inference engines very easily. The system described herein may also support a SPARQL specification including the ability to support counting and grouping.

The MVCC capability of big data supports the creation of a database connection to any state of the database based on a provided timestamp. A point in time consistent view of the database may be the most recent view or any of the previous commit points. As a result, one could obtain multiple views of the database and compare statements producing a change set or maintain a history of the state of the database from time zero enabling a complete historical view of the data under management, all internally managed by the database.

Through its use of MVCC, the system described herein may support "point in time rollback," allowing the current commit point can be moved from the most recent to any previous commit point. This feature is useful for situations where multiple commits may be in error and need to be rolled back. The simpler operation is to move the current commit point, essentially moving a pointer, versus removing potentially thousands of statements. This capability also makes possible the forking of the database based on any commit point so that old data remains accessible. What this allows is the ability to persist the history of any resource or set of resources with the ability to access the state of that information at any point in time. This cost of maintaining this history is merely the disk space required to store the historical journals. The usage of this capability applies to any domain and any use case dealing with the dimension of time (e.g change management, historical relationships).

The system described herein may support basic RDFS inferencing (e.g. subClassOf, subPropertyOf) and limited OWL inferences (e.g. transitive property). A Prolog interpreter written in Java may also be used to further extend the ability to write custom inference rules for big data to execute. The big data API allows for the creation of custom rules to provide for additional inferencing. Inference in big data occurs incrementally so that only new data has inference rules applied reducing the time it takes to perform full inference or "closure" of the database. Removal operations are optimized through the use of "truth maintenance" which persists "justification chains" which simplify the identification of inferences. The ability to persist inferences in the database based on semantic technology rules, such as RDFS/OWL inference rules or generic Prolog rules, is advantageous. Native full-text search capability may be used in connection with the system described herein. For example, the system described herein may be used in connection with the product Apache Lucene by the Apache Software Foundation to provide for a more complete index and search capability.

Figure 16:
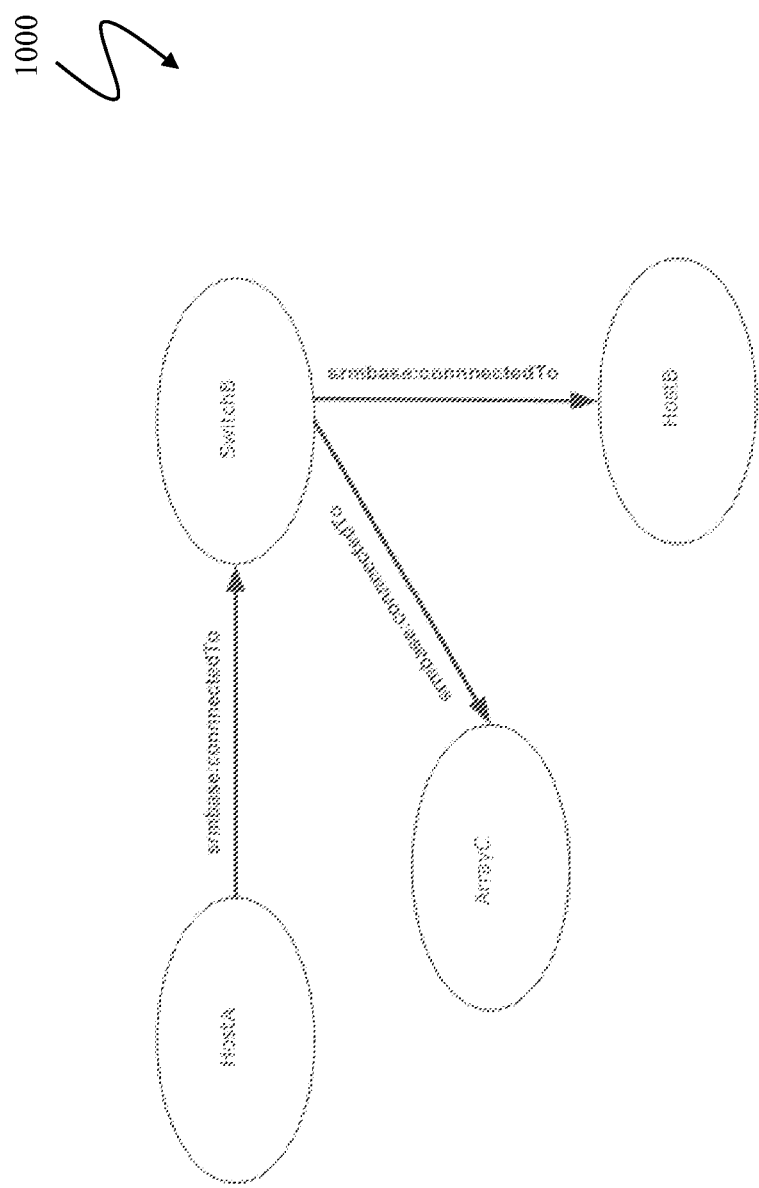
FIG. 16 is a schematic illustration of a SAN graph generated from an RDF model according to the system described herein.

FIG. 16 is a schematic illustration 1000 of a SAN graph generated from an RDF model according to the system described herein. The big data store used in the SRM architecture may manage all configuration and relationship information discovered through the SRM architecture data collection mechanisms. The use of RDF is optimal for graph-based information as RDF is a graph-based model. As shown in the figure, each managed object discovered in the SRM architecture may be physically or logically connected to any number of other objects. The statements that model these relationships (e.g. connectedTo) are stored within big data and then easily queried using SPARQL. For example, a single query is executed to produce the graph of relationships using a Host as a starting point. In an embodiment, these queries may generally return in less than 2 seconds and involve joins over a maximum of 3 indices which is advantageously efficient and quick.

Because both the SRM data model and object instances are represented in RDF, it is easy to modify both the model and the instances, and migrate information between different systems. SRM data can simply be exported in any of the RDF text serializations (e.g. RDF/XML, N3) and then imported into any file or memory-based RDF store or examined as plain text. In an embodiment, the big data stored according to the system described herein may include compliance data, such as compliance data from EMC Corporations Storage Configuration Advisor (SCA) product. The system described herein provides for retaining data history that enables retaining history of compliance breaches, rules and policies as needed in connection with SCA compliance data.

The system described herein may support a change set mechanism which records changes to the database based on assertions and inferences. For example, a transitive "connectedTo" relationship between a host and array and an array and a switch would result in the host-to-switch relationship being inferred. These database changes or events are propagated through the SRM event subsystem for application listeners to consume. For example, map clients use these events to notify the user that the map contents have changed, and compliance rules are executed based on these events firing. The change set mechanism may be an in-memory representation of the database changes. For each database transaction (i.e. set of RDF statements to be added or removed) a change set log may be attached to the transaction and the set of statements that have been modified may be collected in this in-memory log. The history of changes may be persisted to disk in a separate index. This allows changes between any set of commit points to be easily queried at any point in time. This feature provides the ability to perform fast deltas between commit points.

In other embodiments, the system described herein may be used in connection with various store formats, such as column-storage formats. For example, Bigdata® SparseRow-Store is a basic implementation of a column-store, similar to Apache Cassandra and other NoSQL databases. This store supports a flexible schema as well as MVCC which provides for concurrent reads and writes and historical change tracking. This simple embedded store may be used to persist raw performance or capacity metrics.

The SRM information architecture according to the system described herein may manage information about the information it collects. This provides visibility into the freshness and origin of data. Since data about an object may come from multiple sources such as an SRM data collector or an API client (e.g. tagging an object with a location), it is advantageous to retain this "provenance" information to successfully manage and audit the system. The big data feature used to track this information may be called statement identifiers (SIDs). Each statement added to SRM has an identifier which can be used as an anchor to assign other bits of information to that statement (i.e. resource). The system described herein provides for the ability to start with a SID and retrieve all statements associated with that SID. In an embodiment, the system described herein may be used in connection with EMC's Control Center (CC) product in which relevant details of the CC repository may be translated to RDF and the CC RDF statements transformed to the SRM information model using the same data path as the discovery components. The big data store may be used as a temporary staging store for this data.

In another embodiment, the system described herein may be used in connection with EMC's SCA product. The EMC support matrix and the metadata of the SCA product maintains in proprietary formats may be persisted in RDF which then enables efficient query and search as well as the ability to model equivalency relationships. For example, the product may use regular expressions and other techniques to match discovered information (e.g. OS=Windows 2003 SP1) with information coming from the EMC Support Matrix (e.g. OS=Win2K3 SP1). This results in the end-user regularly getting involved to verify matches and requires the use of proprietary matching algorithms. If this information was modeled as RDF one could use OWL sameAs relationships, as an example, to perform these matches in a more efficient and standardized way.

A scalable semantic technology data store like that according to the system described herein may be particularly suitable for the persistence and query of graph-based data models. In various embodiments relational databases may be used in connection with the system described herein managing simpler data models that require less frequent modification and lower insertion rates. Examples of relational databases suitable for use with the system described herein include PostgreSQL and Greenplum products. Data related to frequently changing configurations and relationships (i.e. graphs) may be managed in a big data system, whereas historical performance and capacity metrics may be persisted in a relational database, such as PostgreSQL. The decision to use different persistence back-ends takes into account the access patterns for this information. The historical capacity and performance data is not frequently updated and grows slowly over time, slowly accumulating potentially years' worth of information that may all need to be accessed at any time. End-users (customers, services, partners) may want to report on this information using modern database reporting tools that generally work best with ODBC/JDBC-based databases.

Figure 17:
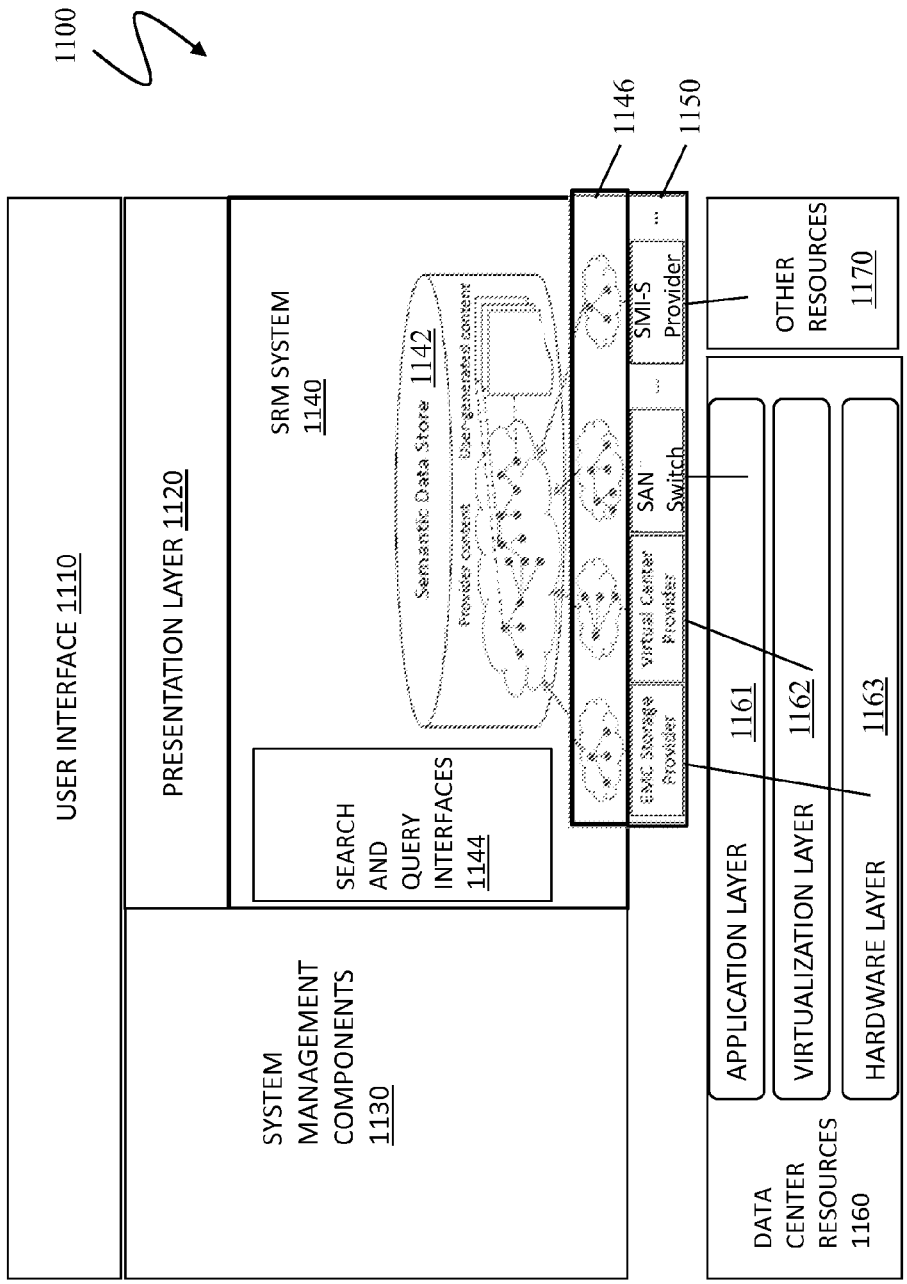
FIG. 17 is a schematic illustration of an architecture with data collection handled by multiple components that populate and enable access to a semantic data store of an SRM system in a cloud computing and/or federated environment according to an embodiment of the system described herein.

FIG. 17 is a schematic illustration of an architecture 1100 with data collection handled by multiple components that populate and enable access to a semantic data store 1142 of an SRM system 1140 in a cloud processing and/or federated environment according to an embodiment of the system described herein. The semantic data store 1142, and/or processing components thereof, may be distributed across multiple data centers of the cloud processing and/or federated environment, as further discussed elsewhere herein. The SRM system 1140 may include search and query interfaces 1144 which are leveraged by a presentation layer 1120 and/or other services to provide search results via a user interface 1110 (e.g., a browser display). System management components 1130, such an infrastructure and/or virtual landscape management components, provide for management of the architecture 1100 in the federated environment.

An advantage of the architecture 1100 is the ease and scale with which data, particularly big data, may be integrated using the SRM system 1140. Information may be obtained in any format from any source (data sources 1150) and easily transformed into RDF, and/or other appropriate semantic web model, by components 1146 of the SRM system 1140. The data sources may provide data from one or more data center resources 1160 with application layers 1161, virtualization layers 1162 and hardware layers 1163 and/or from other resources 1170 such as business resources. The integration of data from the multiple data sources 1150 provides a merger of RDF statements. This merger may occur with any number of RDF datasets or graphs, and persisted to the data store 1142. There are no schema updates or schema alignment issues to deal with. In fact, the statements themselves may be all that is needed, although information of the ontology (i.e. schema) may be used if classification through query and/or inference is required. This is advantageous over an approach to data integration which involves the loading of all information models into one data warehouse using expensive, time-consuming, proprietary and brittle Extract, Transform and Load (ETL) processes, for example.

The system described herein advantageously provides for big data operations using cloud processing, and specifically provides for use of graph databases for semantic technologies that support both the private and public cloud. Advantages of the system described herein may include: fast integration cycle; open standards; integration of heterogeneous data, linked data, structured data, and data at rest; and opportunistic exploitation of data, including data which cannot be integrated quickly enough today to derive its business value. By moving big data storage and processing to the cloud, large scale integration opportunities are afforded. It is noted that, as more cores and graphics processing units (GPUs) are provided in the cloud, larger-scale RDFS and OWL inferencing may be provided for according to the system described herein. The lower costs of solid state drives (SSDs) will also drive its adoption in clouds supported by commodity-based hardware. Other beneficial features that may be provided according to the system described herein are discussed as follows. Query time inference may add materialization of inferences at query-time in addition to the current commit-time inference materialization. This has the advantage of on-disk footprint reduction as inferences are materialized on demand. Stream support may add the ability to stream RDF statements in an optimized fashion, enabling complex event processing integration, for example. Analytic joins with multi-block IO and adaptive query optimization may facilitate high throughput queries that may require full index scan access (e.g. "count(*) where").

In an embodiment, it is noted that a graph database is generally used for situations where a graph of relationships is required. One of the more common examples of this is, for example, LinkedIn which maintains connection relationship sets between its members. LinkedIn has built many custom projects many of which they have open-sourced to solve the problem of big data, which in their case includes the "People You May Know" algorithm. Other examples include Telco use cases where call data records are analyzed to provide opportunities for better data plans or identification of caller relationships.

A direct example of the cloud-based solution is a Storage Resource Management As a Service solution. In such a solution, a separate RDF database, essentially a single data file, is created for each customer, thus avoiding many of the multi-tenancy issues that arise in a partitioned SaaS solution. Where management of multiple database files is not possible, there are multiple modes big data may run in to enable it to easily partition data. The database may run in quads mode where sets of statements can be associated with a tenant or the database is partitioned into multiple "libraries" within the single database instance. A simple "Database As a Service" solution may be easily supported according to the system described herein by running the big data cluster within a private or public cloud environment. An elastic RDF cloud according to the system described herein provides for the ability add/remove big data cluster nodes and dynamically partition data The system described herein provides for the extension of known technologies providing services for large scale data warehousing and analytics. The system described herein provides for RDF data natively within an instance of a data warehousing/analytic process. This capability could be added by running an instance of a big data database within the warehousing/analytic process and exposing the database over the network with a SPARQL endpoint.

In another embodiment, the system described herein may further be used in connection with modeling simple root cause and impact of a system. When combined with large scale persistence, fast query performance and inference, the ability to use a disk-based database for performing root cause is provided. The database may easily materialize or create at query time the relationships required to determine the root cause of a problem and the affected elements in the environment. With the ability of the system described herein to query historical commit points, it is possible to view the system before and after an incident and view the relationships between the affected elements. It is further noted that the system described herein may be used in connection with providing a self-managed cluster. The system described herein may include a combination of disk technologies (SSD, FC, SATA) that would be optimized based on the characteristics of the application. An instance of big data according to the system described herein running within large Java heap and backed by SSD may drive extremely high data rates and support large scale inference over massive datasets.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for providing storage resource management information modeling in a cloud processing environment, comprising:

receiving first data from a first data source;

modeling the first data according to a semantic model to generate first modeled data, wherein the first modeled data generated according to the semantic model includes at least one first semantic model statement representing the first data, and wherein the at least one first semantic model statement is generated using a semantic protocol or semantic inferencing applied to the first data;

receiving second data from a second data source;

modeling the second data according to the semantic model to generate second modeled data, wherein the second modeled data generated according to the semantic model includes at least one second semantic model statement representing the second data, wherein the at least one second semantic model statement is generated using the semantic protocol or semantic inferencing applied to the second data;

storing the first and second modeled data in a data store of the cloud processing environment, wherein the data store is distributed across a plurality of sites of the cloud processing environment, and wherein the data store includes a series of tree data structure indices that store components of the at least one first and second semantic model statements as integer representations;

merging the first and second modeled data including merging the at least one first semantic model statement and the at least one second semantic model statement in the data store using a tree data structure; and in response to a query, accessing the merged first and second modeled data in the data store to service the query.

2. The method according to claim 1, wherein the plurality of sites include a plurality of data centers of the cloud processing environment.

3. The method according to claim 1, wherein an amount of the data from the data source exceeds a threshold, wherein the threshold is a processing threshold that is exceeded were the data processed at a local site.

4. The method according to claim 1, wherein the semantic model includes a semantic web model.

5. The method according to claim 4, wherein the semantic web model is at least one of: a Resource Descriptor Framework (RDF) model or a Web Ontology Language (OWL) model.

6. The method according to claim 1, wherein modeling the data according to the semantic model is performed by at least one semantic engine of the cloud processing environment.

7. The method according to claim 1, further comprising:
converting the received query into a semantic technology query; and
accessing the first and second modeled data in the data store based on the semantic technology query and using results thereof to service the received query.

8. A non-transitory computer readable medium storing software for providing storage resource management information modeling in a cloud processing environment, the software comprising:
executable code that receives first data from a first data source;
executable code that models the first data according to a semantic model to generate modeled data, wherein the first modeled data generated according to the semantic model includes at least one first semantic model statement representing the first data, and wherein the at least one first semantic model statement is generated using a semantic protocol or semantic inferencing applied to the first data;
executable code that receives second data from a second data source;
executable code that models the second data according to the semantic model to generate second modeled data, wherein the second modeled data generated according to the semantic model includes at least one second semantic model statement representing the second data, wherein the at least one second semantic model statement is generated using the semantic protocol or semantic inferencing applied to the second data;
executable code that stores the first and second modeled data in a data store of the cloud processing environment, wherein the data store is distributed across a plurality of sites of the cloud processing environment, and wherein the data store includes a series of tree data structure indices that store components of the at least one first and second semantic model statements as integer representations;
executable code that merges the first and second modeled data including merging the at least one first semantic model statement and the at least one second semantic model statement in the data store using a tree data structure; and
executable code that, in response to a query, accesses the first and second modeled data in the data store to service the query.

9. The non-transitory computer readable medium according to claim 8, wherein the plurality of sites include a plurality of data centers of the cloud processing environment.

10. The non-transitory computer readable medium according to claim 8, wherein an amount of the data exceeds a threshold, and wherein the threshold is a processing threshold that is exceeded were the data processed at a local site.

11. The non-transitory computer readable medium according to claim 8, wherein the semantic model includes a semantic web model.

12. The non-transitory computer readable medium according to claim 11, wherein the semantic web model is at least one of: a Resource Descriptor Framework (RDF) model or a Web Ontology Language (OWL) model.

13. The non-transitory computer readable medium according to claim 8, wherein the executable code that models the data according to the semantic model includes executable code performed by at least one semantic engine of the cloud processing environment.

14. The non-transitory computer-readable medium according to claim 8, wherein the software further comprises:
executable code that converts the received query into a semantic technology query; and
executable code that accesses the first and second modeled data in the data store based on the semantic technology query and using results thereof to service the received query.

15. A storage resource management system, comprising:
a data store that is distributed across a plurality of sites of a cloud processing environment;
a semantic engine including at least one processor; and
a non-transitory computer readable medium storing software for providing storage resource management information modeling in the cloud processing environment, the software comprising:
executable code that receives first data from a first data source;
executable code that models the first data according to a semantic model to generate modeled data, wherein the first modeled data generated according to the semantic model includes at least one first semantic model statement representing the first data, and wherein the at least one first semantic model statement is generated using a semantic protocol or semantic inferencing applied to the first data;
executable code that receives second data from a second data source;
executable code that models the second data according to the semantic model to generate second modeled data, wherein the second modeled data generated according to the semantic model includes at least one second semantic model statement representing the second data, wherein the at least one second semantic model statement is generated using the semantic protocol or semantic inferencing applied to the second data;
executable code that stores the first and second modeled data in a data store of the cloud processing environment, wherein the data store is distributed across a plurality of sites of the cloud processing environment, and wherein the data store includes a series of tree data structure indices that store components of the at least one first and second semantic model statements as integer representations;
executable code that merges the first and second modeled data including merging the at least one first semantic model statement and the at least one second semantic model statement in the data store using a tree data structure; and
executable code that, in response to a query, accesses the first and second modeled data in the data store to service the query.

16. The storage resource management system according to claim 15, wherein the plurality of sites include a plurality of data centers of the cloud processing environment.

17. The storage resource management system according to claim 15, wherein an amount of the data exceeds a threshold, and wherein the threshold is a processing threshold that is exceeded were the data processed at a local site.

18. The storage resource management system according to claim 15, wherein the semantic model includes a semantic web model.

19. The storage resource management system according to claim 18, wherein the semantic web model is at least one of: a Resource Descriptor Framework (RDF) model or a Web Ontology Language (OWL) model.

20. The storage resource management system according to claim 15, wherein the software further comprises:
   executable code that converts the received query into a semantic technology query; and
   executable code that accesses the first and second modeled data in the data store based on the semantic technology query and using results thereof to service the received query.

\* \* \* \* \*